(12) United States Patent
Iwata et al.

(10) Patent No.: US 10,298,807 B2
(45) Date of Patent: May 21, 2019

(54) IMAGE FORMING APPARATUS

(71) Applicants: Muneaki Iwata, Kanagawa (JP);
Masaaki Ishida, Kanagawa (JP);
Atsufumi Omori, Kanagawa (JP);
Naoto Watanabe, Kanagawa (JP);
Hayato Fujita, Kanagawa (JP)

(72) Inventors: Muneaki Iwata, Kanagawa (JP);
Masaaki Ishida, Kanagawa (JP);
Atsufumi Omori, Kanagawa (JP);
Naoto Watanabe, Kanagawa (JP);
Hayato Fujita, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 179 days.

(21) Appl. No.: 15/125,422

(22) PCT Filed: Mar. 10, 2015

(86) PCT No.: PCT/JP2015/057604
§ 371 (c)(1),
(2) Date: Sep. 12, 2016

(87) PCT Pub. No.: WO2015/137510
PCT Pub. Date: Sep. 17, 2015

(65) Prior Publication Data
US 2018/0176414 A1    Jun. 21, 2018

(30) Foreign Application Priority Data
Mar. 13, 2014 (JP) .................. 2014-050408

(51) Int. Cl.
*G06K 15/02* (2006.01)
*H04N 1/393* (2006.01)
(Continued)

(52) U.S. Cl.
CPC ............ *H04N 1/3935* (2013.01); *B41J 2/505* (2013.01); *H04N 1/393* (2013.01);
(Continued)

(58) Field of Classification Search
CPC .......... G06K 15/02; G06K 15/00; G06K 9/44; G06K 9/4604; H04N 1/40068;
(Continued)

(56) References Cited

U.S. PATENT DOCUMENTS 6,118,798 A    9/2000   Ema et al.
6,498,617 B1   12/2002  Ishida et al.
(Continued)

FOREIGN PATENT DOCUMENTS

JP    10-095141      4/1998
JP    2008-085487    4/2008
(Continued)

OTHER PUBLICATIONS

Extended European Search Report dated Feb. 28, 2017 in Patent Application No. 15760973.6
(Continued)

*Primary Examiner* — Moustapha Diaby
(74) *Attorney, Agent, or Firm* — Oblon, McClelland, Maier & Neustadt, L.L.P.

(57) ABSTRACT

An image forming apparatus includes an image processor, a converter, a light source driver, an identifying unit, and a pattern generator. The image processor generates image data of first resolution and generates tag information indicating whether to perform image processing and associated with pixels of the image data of first resolution. The converter converts the image data of first resolution to image data of a higher second resolution. The light source driver drives a light source using a modulation signal corresponding to the image data of second resolution. The identifying unit iden- (Continued)

tifies a target pixel to be subjected to image processing in the image data of first resolution based on the tag information. The pattern generator generates an image-processed pixel pattern of the second resolution according to the target pixel. The converter converts the target pixel in the image data of first resolution to the generated image-processed pixel pattern.

7 Claims, 20 Drawing Sheets

(51) Int. Cl.
    *B41J 2/505* (2006.01)
    *H04N 1/411* (2006.01)
    *H04N 1/40* (2006.01)
    *G06K 9/44* (2006.01)
    *H04N 1/113* (2006.01)

(52) U.S. Cl.
    CPC ......... *H04N 1/40068* (2013.01); *H04N 1/411* (2013.01); *G06K 9/44* (2013.01); *H04N 1/113* (2013.01)

(58) Field of Classification Search
    CPC ...... H04N 1/3935; H04N 1/393; H04N 1/411; H04N 1/113; B41J 2/505; G06T 7/13; G06T 7/12
    See application file for complete search history.

(56) References Cited

U.S. PATENT DOCUMENTS

| | | |
|---|---|---|
| 2002/0130944 A1 | 9/2002 | Ema et al. |
| 2003/0025785 A1 | 2/2003 | Nihei et al. |
| 2003/0067533 A1 | 4/2003 | Omori et al. |
| 2006/0274332 A1 | 12/2006 | Miyagi |
| 2006/0285167 A1* | 12/2006 | Washio ................ H04N 1/405 358/3.14 |
| 2007/0058177 A1* | 3/2007 | Teshima ................ G06K 15/02 358/1.2 |
| 2007/0132828 A1 | 6/2007 | Ishida et al. |
| 2008/0074699 A1 | 3/2008 | Washio |
| 2008/0088893 A1* | 4/2008 | Ishida ................ G06K 15/1219 358/509 |
| 2008/0123160 A1 | 5/2008 | Omori et al. |
| 2008/0218813 A1 | 9/2008 | Tanabe et al. |
| 2008/0225106 A1 | 9/2008 | Omori et al. |
| 2008/0239336 A1 | 10/2008 | Tanabe et al. |
| 2008/0291259 A1 | 11/2008 | Nihei et al. |
| 2009/0059255 A1 | 3/2009 | Ohide |
| 2009/0091805 A1 | 4/2009 | Tanabe et al. |
| 2009/0174915 A1 | 7/2009 | Nihei et al. |
| 2009/0195635 A1 | 8/2009 | Ishida et al. |
| 2009/0213400 A1 | 8/2009 | Saka et al. |
| 2010/0265549 A1 | 10/2010 | Kashibuchi et al. |
| 2011/0199657 A1 | 8/2011 | Ishida et al. |
| 2011/0228037 A1 | 9/2011 | Omori et al. |
| 2012/0099165 A1 | 4/2012 | Omori et al. |
| 2012/0189328 A1 | 7/2012 | Suzuki et al. |
| 2012/0224775 A1 | 9/2012 | Genda |
| 2012/0293783 A1 | 11/2012 | Ishida et al. |
| 2013/0243459 A1 | 9/2013 | Omori et al. |
| 2013/0302052 A1 | 11/2013 | Iwata et al. |
| 2014/0139603 A1 | 5/2014 | Fujita et al. |
| 2014/0176656 A1 | 6/2014 | Omori et al. |
| 2014/0268186 A1 | 9/2014 | Iwata et al. |
| 2014/0327938 A1 | 11/2014 | Ishida et al. |
| 2014/0333940 A1 | 11/2014 | Iwata et al. |
| 2014/0333941 A1 | 11/2014 | Iwata et al. |

FOREIGN PATENT DOCUMENTS

| | | |
|---|---|---|
| JP | 2009-081838 | 4/2009 |
| JP | 4640257 | 12/2010 |
| JP | 4968902 | 4/2012 |
| JP | 2013-222983 | 10/2013 |
| JP | 2014-014007 | 1/2014 |

OTHER PUBLICATIONS

International Search Report dated May 26, 2015 in PCT/JP2015/057604 filed on Mar. 10, 2015.

* cited by examiner

FIG.15

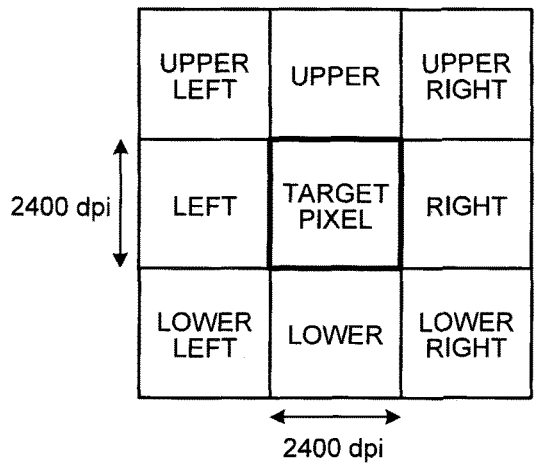

- (UPPER LEFT+UPPER+UPPER RIGHT)
  >(LOWER LEFT+LOWER+LOWER RIGHT)
  ⇒LOWER SIDE LIGHT OFF
- (UPPER LEFT+UPPER+UPPER RIGHT)
  <(LOWER LEFT+LOWER+LOWER RIGHT)
  ⇒UPPER SIDE LIGHT OFF
- (UPPER LEFT+UPPER+UPPER RIGHT)
  =(LOWER LEFT+LOWER+LOWER RIGHT)
  ⇒NO VERTICAL PROCESSING
- (UPPER LEFT+LEFT+LOWER LEFT)
  >(UPPER RIGHT+RIGHT+LOWER RIGHT)
  ⇒RIGHT-HAND SIDE LIGHT OFF
- (UPPER LEFT+LEFT+LOWER LEFT)
  <(UPPER RIGHT+RIGHT+LOWER RIGHT)
  ⇒LEFT-HAND SIDE LIGHT OFF
- (UPPER LEFT+LEFT+LOWER LEFT)
  =(UPPER RIGHT+RIGHT+LOWER RIGHT)
  ⇒NO LATERAL PROCESSING

FIG.16

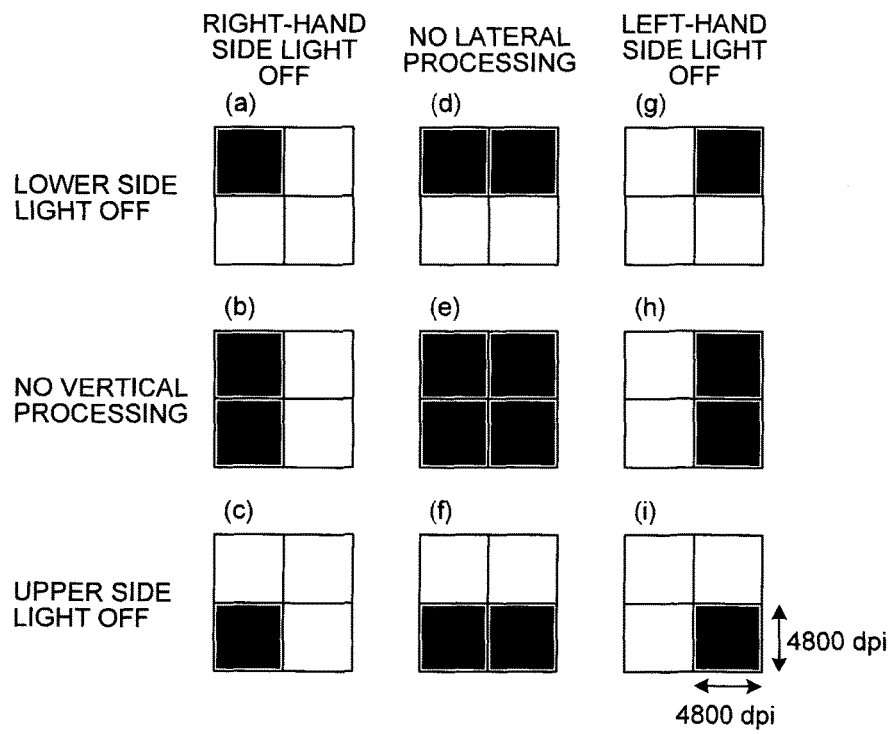

IMAGE FORMING APPARATUS

TECHNICAL FIELD

The present invention relates to an image forming apparatus.

BACKGROUND ART

Digital printers employing an electrophotographic process have lately become widely used in the production printing field. The digital printers employing the electrophotographic process are thus required to offer higher image quality and greater reliability. In particular, the digital printers employing the electrophotographic process are required to offer, for example, improved fine line reproducibility, improved character reproducibility (e.g., improved reproducibility of characters of minute sizes equivalent to 2 to 3 points), prevention of characters from becoming broader due to the electrophotographic process, and improved color shift correction accuracy.

In order to achieve the higher image quality, the digital printer employing the electrophotographic process includes an image processor that corrects image data through image processing. The image processor performs image processing for, for example, multi-bit data having a high resolution, for example, of 1200 dots per inch (dpi) or 2400 dpi.

The digital printer employing the electrophotographic process further includes, for example, a photoconductor drum, a light source, a polygon mirror, and a scanning optical system. Specifically, the photoconductor drum has a surface that functions as a scanned surface having photosensitivity; the light source emits a laser beam; the polygon mirror deflects the laser beam from the light source; and the scanning optical system guides the laser beam deflected by the polygon mirror onto the surface (scanned surface) of the photoconductor drum. The digital printer employing the electrophotographic process modulates luminous flux emitted from the light source according to the image data to thereby irradiate the scanned surface with the luminous flux from the light source. By then scanning the scanned surface with the luminous flux, the digital printer employing the electrophotographic process forms an electrostatic latent image on the photoconductor drum according to the image data.

The digital printer employing the electrophotographic process having the configuration as described above includes as the light source a laser diode array (LDA), a vertical-cavity surface-emitting laser (VCSEL), or other element having a plurality of light emitting points. This arrangement enables the digital printer employing the electrophotographic process to form an electrostatic latent image having a resolution higher than image data of 1200 dpi, specifically, a 2400-dpi or 4800-dpi electrostatic latent image.

Patent Literatures 1 and 2 each disclose a technique in which, through processing performed by an image processor, blank portions in the image are detected and blank lines are extended or pixels around blank characters are corrected. Reverse characters (drawn in white on a black background) are thereby prevented from being collapsed and improved character reproducibility is achieved. Patent Literature 3 discloses a technique in which a controller simultaneously performs both thinning and smoothing using template matching with multi-valued data.

Processing of a high-density image involves a problem in data transfer from the image processor to a light source drive circuit downstream thereof. If the image processor processes multi-bit data images with a resolution, for example, of 2400 dpi or 4800 dpi, the degree of freedom in image processing is enhanced and reproducibility of 1200-dpi characters and lines of minute sizes can be improved. High-density image processing, however, requires an enormous amount of data to be transferred from the image processor to the downstream light source drive circuit, which restricts a productivity improvement rate.

Performing all processing for improving reproducibility of the minute characters and lines with the upstream image processor makes the processing complicated and places a heavier load on the image processor.

CITATION LIST

Patent Literature

[PTL 1]
  Patent document 1: Japanese Patent No. 4968902
[PTL 2]
  Patent document 2: Japanese Patent No. 4640257
[PTL 3]
  Patent document 3: Japanese Patent Application Laid-open No. 2008-85487

DISCLOSURE OF INVENTION

Problem to be Solved by the Invention

The present invention has been made in view of the foregoing situation and it is an object of the present invention to provide an image forming apparatus that performs image processing at higher resolutions to thereby achieve higher image quality without increasing an image data transfer amount.

Means for Solving Problem

According to the present invention, there is provided an image forming apparatus that forms an image corresponding to light emitted from a light source, the image forming apparatus comprising: an image processing unit that generates image data having a first resolution and tag information indicating whether to perform image processing, the tag information being associated with each of pixels of the image data having the first resolution; a converter that converts the image data having the first resolution to image data having a second resolution higher than the first resolution; a light source driver that drives the light source using a modulation signal corresponding to the image data having the second resolution; an identifying unit that identifies a target pixel to be subjected to image processing in the image data having the first resolution on a basis of the tag information; and a pattern generator that generates an image-processed pixel pattern having the second resolution according to the target pixel, wherein the converter converts the target pixel in the image data having the first resolution to the generated image-processed pixel pattern.

Effect of the Invention

The present invention can achieve higher image quality by performing image processing at higher resolutions without increasing an image data transfer amount.

BRIEF DESCRIPTION OF DRAWINGS

FIG. 15 is a diagram illustrating criteria for selecting a pixel pattern when a character or a line is thinned.

FIG. 16 that includes parts (a) to (i) is diagram illustrating exemplary pixel patterns that replace target pixels when a character or a line is thinned.

BEST MODE FOR CARRYING OUT THE INVENTION

A color printer 2000 as an exemplary image forming apparatus according to an embodiment of the present invention will be described in detail below with reference to the accompanying drawings.

Figure 1:
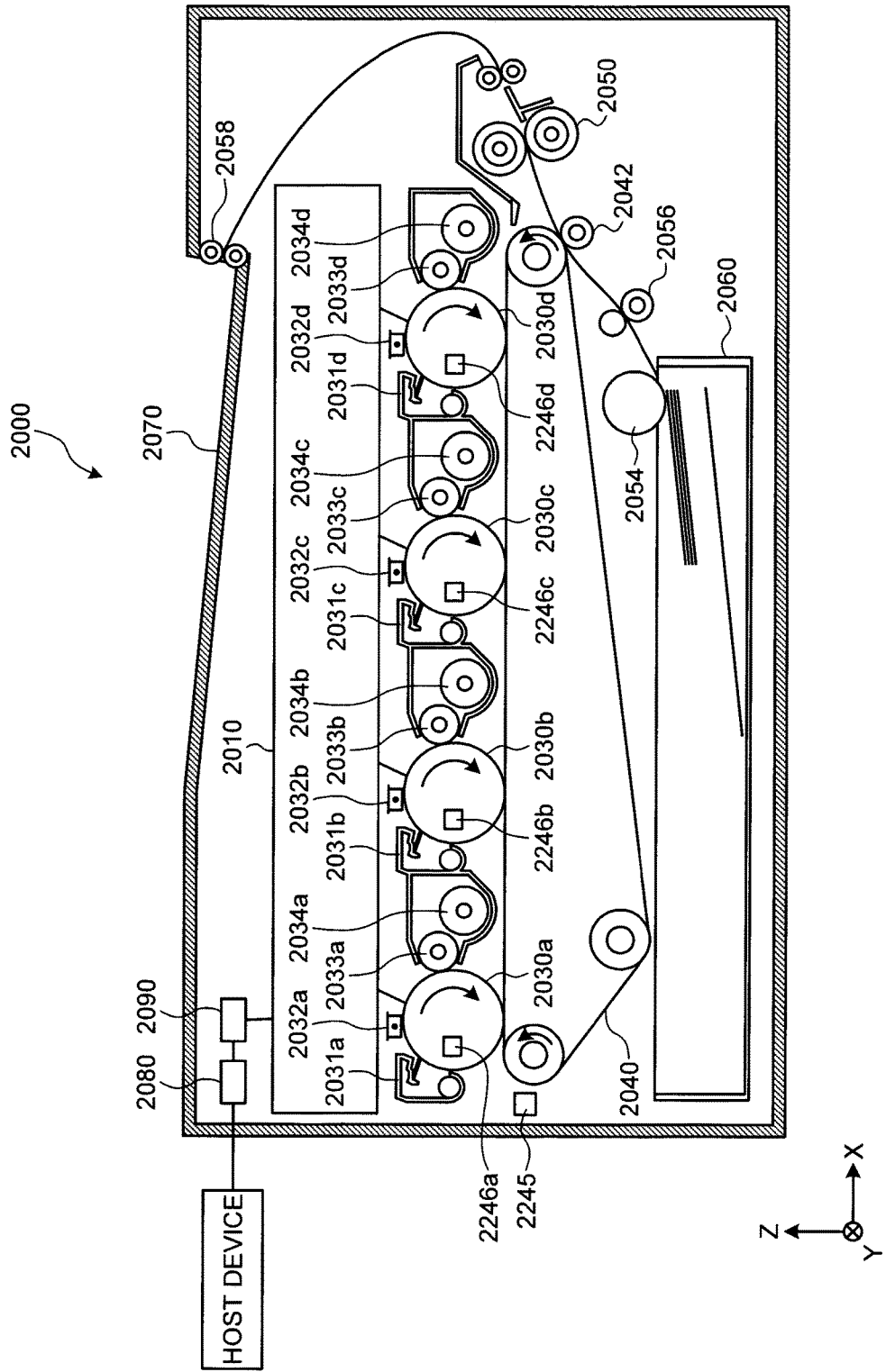
FIG. 1 is a schematic diagram illustrating a configuration of a color printer 2000 according to an embodiment of the present invention.

FIG. 1 is a schematic diagram illustrating a configuration of the color printer 2000 according to the embodiment. The color printer 2000 transfers toner to a recording sheet (a target object) to thereby produce printed matter. The color printer 2000 is a tandem system multi-color printer that forms a full-color image by superimposing four colors (black, cyan, magenta, and yellow), one on top of another.

The color printer 2000 includes an optical scanning device 2010, four photoconductor drums 2030a, 2030b, 2030c, and 2030d (to be collectively referred to as a photoconductor drum 2030), four cleaning units 2031a, 2031b, 2031c, and 2031d (to be collectively referred to as a cleaning unit 2031), and four charging devices 2032a, 2032b, 2032c, and 2032d (to be collectively referred to as a charging device 2032). The color printer 2000 further includes four developing rollers 2033a, 2033b, 2033c, and 2033d (to be collectively referred to as a developing roller 2033) and four toner cartridges 2034a, 2034b, 2034c, and 2034d (to be collectively referred to as a toner cartridge 2034). The color printer 2000 still further includes a transfer belt 2040, a transfer roller 2042, a pair of fixing rollers 2050, a paper feeding roll 2054, a pair of registration rollers 2056, a pair of paper ejection rollers 2058, a paper feeding tray 2060, a paper ejection tray 2070, a communication control device 2080, a density detector 2245, four home position sensors 2246a, 2246b, 2246c, and 2246d (to be collectively referred to as a home position sensor 2246), and a printer control device 2090.

The communication control device 2080 controls bi-directional communications with a host device (e.g., a computer) via, for example, a network.

The printer control device 2090 generally controls different elements of the color printer 2000. The color printer 2000 includes, for example, a central processing unit (CPU), a ROM that stores a program described in codes to be executed by the CPU and various types of data used for executing the program, a RAM that serves as a working memory, and an AD converter circuit that converts analog data to corresponding digital data. The printer control device 2090, while controlling each of the different elements according to a request from the host device, transmits image data from the host device to the optical scanning device 2010.

The photoconductor drum 2030a, the charging device 2032a, the developing roller 2033a, the toner cartridge 2034a, and the cleaning unit 2031a are used as one set of unit. These elements constitute an image forming station to form a black image (may be referred to as a K station).

The photoconductor drum 2030b, the charging device 2032b, the developing roller 2033b, the toner cartridge 2034b, and the cleaning unit 2031b are used as one set of unit. These elements constitute an image forming station to form a cyan image (may be referred to as a C station).

The photoconductor drum 2030c, the charging device 2032c, the developing roller 2033c, the toner cartridge 2034c, and the cleaning unit 2031c are used as one set of unit. These elements constitute an image forming station to form a magenta image (may be referred to as an M station).

The photoconductor drum 2030d, the charging device 2032d, the developing roller 2033d, the toner cartridge 2034d, and the cleaning unit 2031d are used as one set of unit. These elements constitute an image forming station to form a yellow image (may be referred to as a Y station).

The photoconductor drum 2030 is an exemplary latent image bearer having a photoconductive layer formed on its surface. Specifically, the surface of the photoconductor drum 2030 is a scanned surface. It is noted that each of the photosensitive drums 2030a, 2030b, 2030c, and 2030d has a rotational axis extending in parallel with each other and each rotates, for example, in an identical direction (e.g., in the direction of the arrow in plane in FIG. 1).

The following description is provided, in an XYZ three-dimensional Cartesian coordinate system, assuming that a direction extending in parallel with a central axis of the photoconductor drum 2030 is a Y-axis direction and a direction in which the photoconductor drums 2030 are arrayed is an X-axis direction.

The charging device 2032 uniformly charges the surface of the photoconductor drum 2030. The optical scanning device 2010 irradiates the charged surface of the photoconductor drum 2030 with luminous flux modulated for each color based on the image data (black image data, cyan image data, magenta image data, and yellow image data). As a result, on the surface of the photoconductor drum 2030, an electric charge only on portions irradiated with the light is dissipated and a latent image corresponding to the image data is formed on the surface of the photoconductor drum 2030. The latent image thus formed moves toward the developing roller 2033 as the photoconductor drum 2030 rotates. A configuration of the optical scanning device 2010 will be described in detail later.

In the photoconductor drum 2030, an area in which image data is written may be called an "effective scanning area", an "image forming area", or an "effective image area".

The toner cartridge 2034a stores black toner. The black toner is supplied to the developing roller 2033a. The toner cartridge 2034b stores cyan toner. The cyan toner is supplied to the developing roller 2033b. The toner cartridge 2034c stores magenta toner. The magenta toner is supplied to the developing roller 2033c. The toner cartridge 2034d stores yellow toner. The yellow toner is supplied to the developing roller 2033d.

As the developing roller 2033 rotates, a thin, uniform coat of toner from the corresponding toner cartridge 2034 is applied to the surface of the developing roller 2033. The toner on the surface of the developing roller 2033, upon contacting with the surface of the corresponding photoconductor drum 2030, transfers only to portions of the surface irradiated with the light and adheres thereto. Specifically, the developing roller 2033 causes the toner to adhere to the latent image formed on the surface of the corresponding photoconductor drum 2030 to thereby visualize the latent image.

The transfer belt 2040 is trained over a belt rotating mechanism, rotating in a predetermined direction. The transfer belt 2040 has an outer surface contacting the surface of each of the photoconductor drums 2030a, 2030b, 2030c, and 2030d at a position on a side opposite to the optical scanning device 2010. In addition, the outer surface of the transfer belt 2040 contacts the transfer roller 2042.

An image to which the toner adheres on the surface of the photoconductor drum 2030 (a toner image) is moved toward the transfer belt 2040 as the photoconductor drum 2030 rotates. The toner images of yellow, magenta, cyan, and black are then transferred, in sequence, onto the transfer belt 2040 at predetermined timing and are superimposed one on top of another to form a color image. The color image formed on the transfer belt 2040 is moved toward the transfer roller 2042 as the transfer belt 2040 moves.

The paper feeding tray 2060 stores recording sheets. The paper feeding roll 2054 is disposed near the paper feeding tray 2060. The paper feeding roll 2054 takes up the recording sheet, one sheet at a time, from the paper feeding tray 2060 and conveys the recording sheet onto the pair of registration rollers 2056.

The pair of registration rollers 2056 feeds the recording sheet toward a gap between the transfer belt 2040 and the transfer roller 2042 at predetermined timing. This feeding of the recording sheet causes the color image on the transfer belt 2040 to be transferred onto the recording sheet. The recording sheet onto which the color image has been transferred is fed to the fixing roller 2050.

The fixing roller 2050 applies heat and pressure to the recording sheet. This application of heat and pressure enables the fixing roller 2050 to fix the toner on the recording sheet. The recording sheet on which the toner has been fixed is fed onto the paper ejection tray 2070 by way of the paper ejection roller 2058 and stacked in sequence on the paper ejection tray 2070.

The cleaning unit 2031 removes toner (residual toner) left on the surface of the photoconductor drum 2030. The surface of the photoconductor drum 2030 from which the residual toner has been removed returns to a position facing the corresponding charging device 2032 again.

Figure 2:
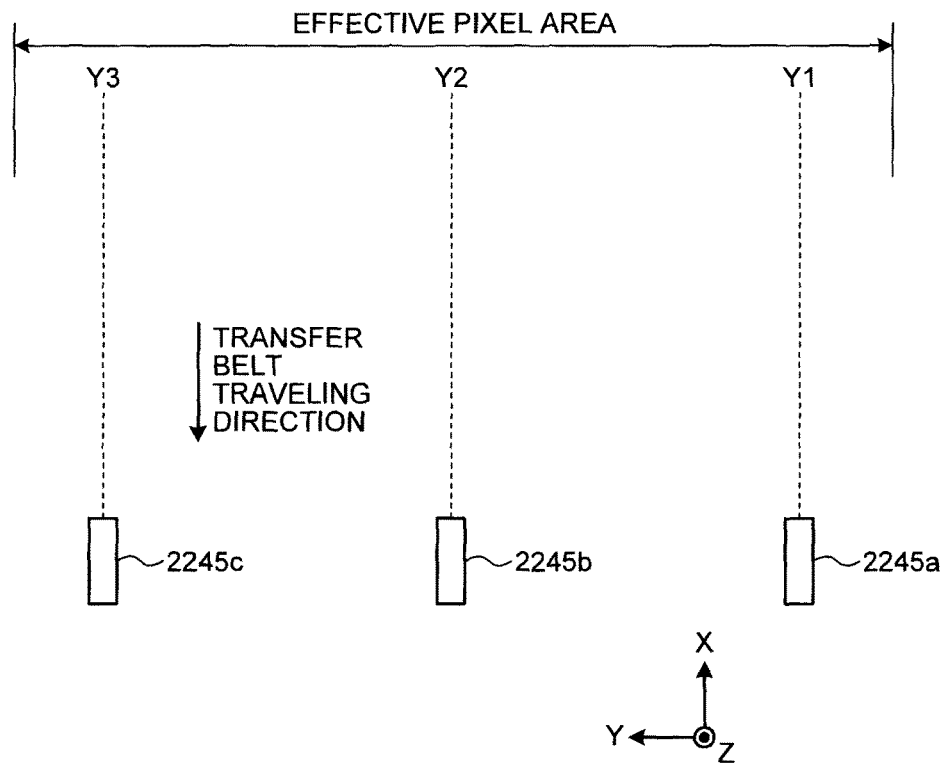
FIG. 2 is a diagram illustrating an exemplary arrangement of optical sensors 2245a, 2245b, and 2245c.

The density detector 2245 is disposed at a position on a −X side of the transfer belt 2040 (upstream of the fixing roller 2050 in a traveling direction of the transfer belt 2040 and downstream of the four photoconductor drums 2030). Exemplarily, the density detector 2245 includes three optical sensors 2245a, 2245b, and 2245c as illustrated in FIG. 2.

The optical sensor 2245a is disposed at a position facing a position near an end portion on a −Y side within the effective image area in the transfer belt 2040 (on a first end side in a width direction of the transfer belt 2040). The optical sensor 2245c is disposed at a position facing a position near an end portion on a +Y side within the effective image area in the transfer belt 2040 (on a second end side in the width direction of the transfer belt 2040). The optical sensor 2245b is disposed substantially at a center between the optical sensor 2245a and the optical sensor 2245c with respect to a main-scanning direction (at a central position in the width direction of the transfer belt 2040). In this description, with respect to the main-scanning direction (Y-axis direction), the central position of the optical sensor 2245a is denoted Y1, the central position of the optical sensor 2245b is denoted Y2, and the central position of the optical sensor 2245c is denoted Y3.

Figure 3:
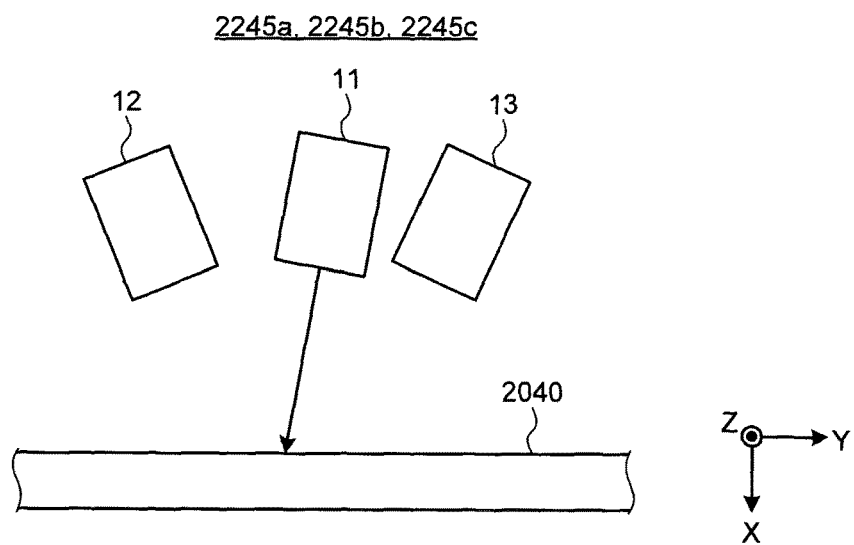
FIG. 3 is a diagram illustrating a configuration of each of the optical sensors 2245a, 2245b, and 2245c.

The optical sensors 2245a, 2245b, and 2245c each exemplarily include an LED 11, a regularly reflected light receiving element 12, and a diffusely reflected light receiving element 13 as illustrated in FIG. 3. Specifically, the LED 11 emits light (hereinafter referred to also as detection light) toward the transfer belt 2040. The regularly reflected light receiving element 12 receives light reflected regularly from the transfer belt 2040 or a toner pad on the transfer belt 2040. The diffusely reflected light receiving element 13 receives light reflected diffusely from the transfer belt 2040 or the toner pad on the transfer belt 2040. Each of these receiving elements outputs a signal corresponding to an amount of received light (photoelectric conversion signal).

The home position sensor 2246a detects a home position in rotation of the photoconductor drum 2030a. The home position sensor 2246b detects a home position in rotation of the photoconductor drum 2030b. The home position sensor 2246c detects a home position in rotation of the photoconductor drum 2030c. The home position sensor 2246d detects a home position in rotation of the photoconductor drum 2030d.

Figure 4:
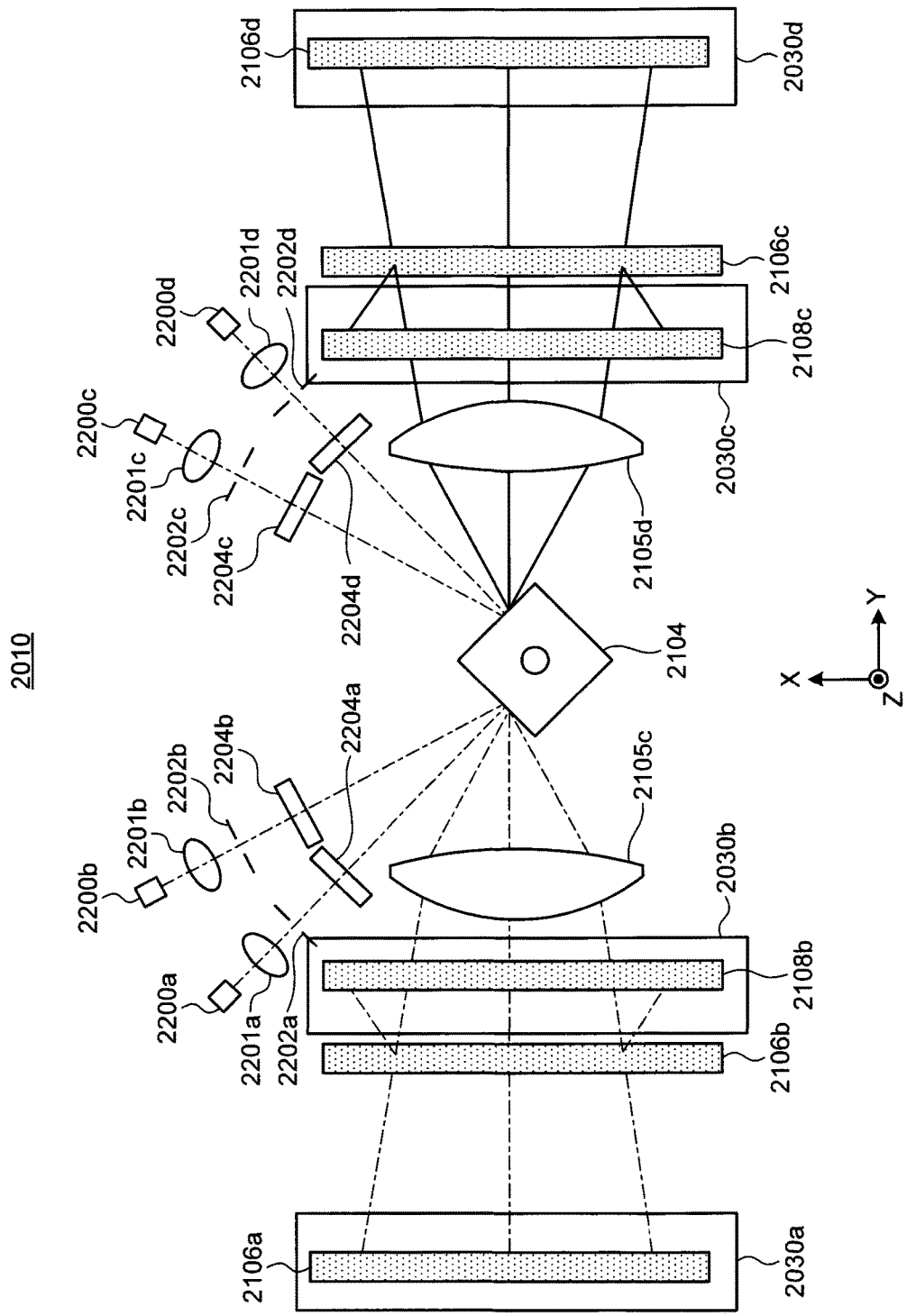
FIG. 4 is a diagram illustrating a configuration of an optical system of an optical scanning device 2010.
Figure 5:
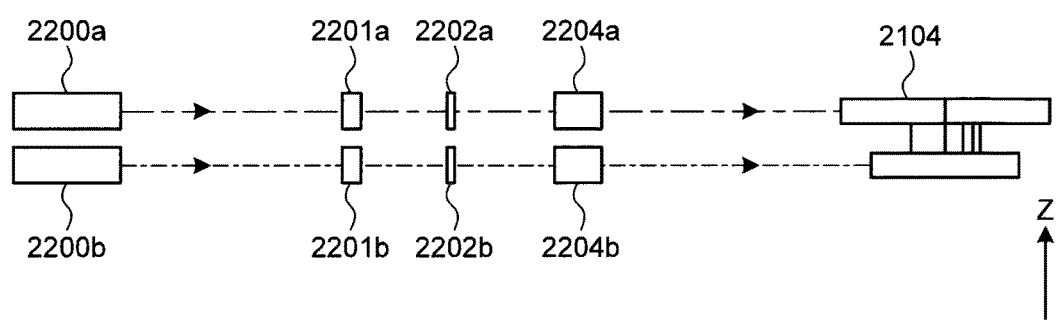
FIG. 5 is a diagram illustrating an exemplary optical path from a light source 2200a to a polygon mirror 2104 and an exemplary optical path from a light source 2200b to the polygon mirror 2104.
Figure 6:
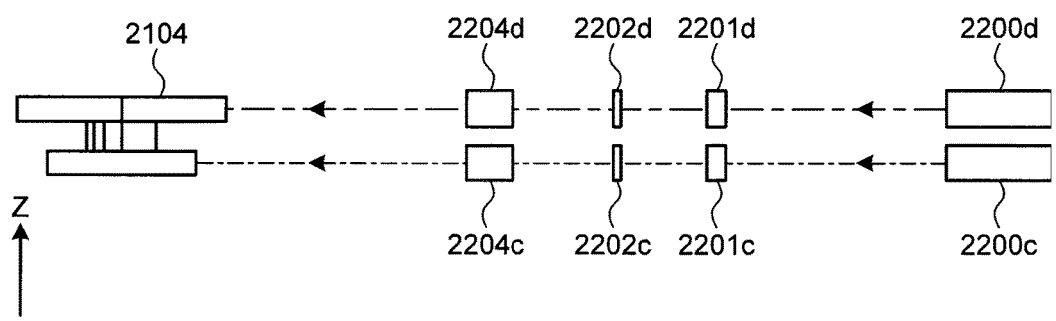
FIG. 6 is a diagram illustrating an exemplary optical path from a light source 2200c to the polygon mirror 2104 and an exemplary optical path from a light source 2200d to the polygon mirror 2104.
Figure 7:
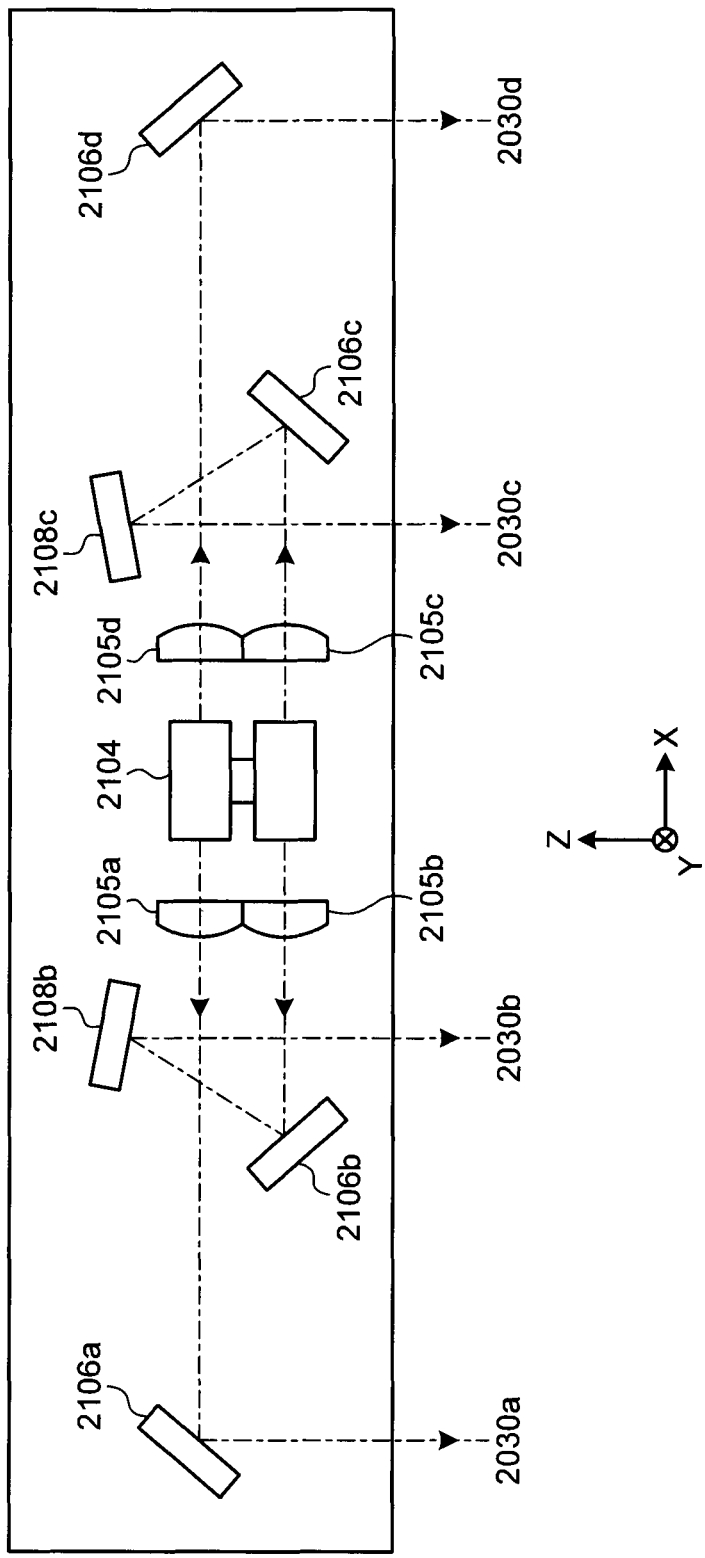
FIG. 7 is a diagram illustrating an exemplary optical path from the polygon mirror 2104 to respective photoconductor drums 2030.

FIG. 4 is a diagram illustrating a configuration of an optical system of the optical scanning device 2010. FIG. 5 is a diagram illustrating an exemplary optical path from a light source 2200a to a polygon mirror 2104 and an exemplary optical path from a light source 2200b to the polygon mirror 2104. FIG. 6 is a diagram illustrating an exemplary optical path from a light source 2200c to the polygon mirror 2104 and an exemplary optical path from a light source 2200d to the polygon mirror 2104. FIG. 7 is a diagram illustrating an exemplary optical path from the polygon mirror 2104 to respective photoconductor drums 2030.

The following describes the configuration of the optical system of the optical scanning device 2010. The optical scanning device 2010 includes, as its optical system, the four light sources 2200a, 2200b, 2200c, and 2200d, four coupling lenses 2201a, 2201b, 2201c, and 2201d, four aperture plates 2202a, 2202b, 2202c, and 2202d, and four cylindrical lenses 2204a, 2204b, 2204c, and 2204d. The optical scanning device 2010 further includes, as the optical system, the polygon mirror 2104, four scanning lenses 2105a, 2105b, 2105c, and 2105d, and six folding mirrors 2106a, 2106b, 2106c, 2106d, 2108b, and 2108c. These components are disposed at respective predetermined positions in an optical housing.

The optical scanning device 2010 still further includes an electric circuit which will be described with reference to FIG. 8 and onward.

The light sources 2200a, 2200b, 2200c, and 2200d each include a surface emitting laser array in which a plurality of light emitting portions are arrayed two-dimensionally. The light emitting portions of the surface emitting laser array are arrayed so as to be equidistant from each other when all light emitting portions are orthographically projected onto a virtual line extending in a direction corresponding to a sub-scanning direction. The light sources 2200a, 2200b, 2200c, and 2200d are each an exemplary vertical-cavity surface-emitting laser (VCSEL).

The coupling lens 2201a is disposed on a light path of luminous flux emitted from the light source 2200a, changing the luminous flux passing therethrough to substantially parallel luminous flux. The coupling lens 2201b is disposed on a light path of luminous flux emitted from the light source 2200b, changing the luminous flux passing therethrough to substantially parallel luminous flux. The coupling lens 2201c is disposed on a light path of luminous flux emitted from the light source 2200c, changing the luminous flux passing therethrough to substantially parallel luminous flux. The coupling lens 2201d is disposed on a light path of luminous flux emitted from the light source 2200d, changing the luminous flux passing therethrough to substantially parallel luminous flux.

The aperture plate 2202a has an aperture and shapes the luminous flux that has passed through the coupling lens 2201a. The aperture plate 2202b has an aperture and shapes the luminous flux that has passed through the coupling lens 2201b. The aperture plate 2202c has an aperture and shapes the luminous flux that has passed through the coupling lens 2201c. The aperture plate 2202d has an aperture and shapes the luminous flux that has passed through the coupling lens 2201d.

The cylindrical lens 2204a focuses the luminous flux that has passed through the aperture of the aperture plate 2202a onto a position near a deflecting reflection surface of the polygon mirror 2104 with respect to a Z-axis direction. The cylindrical lens 2204b focuses the luminous flux that has passed through the aperture of the aperture plate 2202b onto a position near the deflecting reflection surface of the polygon mirror 2104 with respect to the Z-axis direction. The cylindrical lens 2204c focuses the luminous flux that has passed through the aperture of the aperture plate 2202c onto a position near the deflecting reflection surface of the polygon mirror 2104 with respect to the Z-axis direction. The cylindrical lens 2204d focuses the luminous flux that has passed through the aperture of the aperture plate 2202d onto a position near the deflecting reflection surface of the polygon mirror 2104 with respect to the Z-axis direction.

An optical system comprising the coupling lens 2201a, the aperture plate 2202a, and the cylindrical lens 2204a is a pre-deflector optical system for the K station. An optical system comprising the coupling lens 2201b, the aperture plate 2202b, and the cylindrical lens 2204b is a pre-deflector optical system for the C station. An optical system comprising the coupling lens 2201c, the aperture plate 2202c, and the cylindrical lens 2204c is a pre-deflector optical system for the M station. An optical system comprising the coupling lens 2201d, the aperture plate 2202d, and the cylindrical lens 2204d is a pre-deflector optical system for the Y station.

The polygon mirror 2104 includes a four-face mirror having a two-stage structure rotating about an axis extending in parallel with the Z-axis. Each face of the polygon mirror 2104 assumes a deflecting reflection surface. The polygon mirror 2104 is disposed such that the four-face mirror of a first stage (lower stage) deflects the luminous flux from the cylindrical lens 2204b and the luminous flux from the cylindrical lens 2204c, while the four-face mirror of a second stage (upper stage) deflects the luminous flux from the cylindrical lens 2204a and the luminous flux from the cylindrical lens 2204d.

In addition, the luminous flux from the cylindrical lens 2204a and the luminous flux from the cylindrical lens 2204b are deflected to the −X side of the polygon mirror 2104, while the luminous flux from the cylindrical lens 2204c and the luminous flux from the cylindrical lens 2204d are deflected to the +X side of the polygon mirror 2104.

The scanning lenses 2105a, 2105b, 2105c, and 2105d each have optical power that converges the luminous flux on a position near the corresponding photoconductor drum 2030 and optical power that causes an optical spot to move on the surface of the corresponding photoconductor drum 2030 in the main-scanning direction at a constant speed as the polygon mirror 2104 rotates.

The scanning lens 2105a and the scanning lens 2105b are disposed on the −X side of the polygon mirror 2104. The scanning lens 2105c and the scanning lens 2105d are disposed on the +X side of the polygon mirror 2104.

The scanning lens 2105a and the scanning lens 2105b are stacked in the Z-axis direction. The scanning lens 2105b faces the four-face mirror of the first stage. The scanning lens 2105a faces the four-face mirror of the second stage.

Similarly, the scanning lens 2105c and the scanning lens 2105d are stacked in the Z-axis direction. The scanning lens 2105c faces the four-face mirror of the first stage. The scanning lens 2105d faces the four-face mirror of the second stage.

The photoconductor drum 2030a is irradiated, via the scanning lens 2105a and the folding mirror 2106a, with the luminous flux from the cylindrical lens 2204a deflected by the polygon mirror 2104. This forms an optical spot. The optical spot moves in a longitudinal direction of the photoconductor drum 2030a as the polygon mirror 2104 rotates. Specifically, the optical spot scans the surface of the photoconductor drum 2030a. The direction in which the optical spot moves at this time is the "main-scanning direction" in the photoconductor drum 2030a and the direction in which the photoconductor drum 2030a rotates is the "sub-scanning direction" in the photoconductor drum 2030a.

The photoconductor drum 2030b is irradiated, via the scanning lens 2105b, the folding mirror 2106b, and the folding mirror 2108b, with the luminous flux from the cylindrical lens 2204b deflected by the polygon mirror 2104. This forms an optical spot. The optical spot moves in a longitudinal direction of the photoconductor drum 2030b as the polygon mirror 2104 rotates. Specifically, the optical spot scans the surface of the photoconductor drum 2030b. The direction in which the optical spot moves at this time is the "main-scanning direction" in the photoconductor drum 2030b and the direction in which the photoconductor drum 2030b rotates is the "sub-scanning direction" in the photoconductor drum 2030b.

The photoconductor drum 2030c is irradiated, via the scanning lens 2105c, the folding mirror 2106c, and the folding mirror 2108c, with the luminous flux from the cylindrical lens 2204c deflected by the polygon mirror 2104. This forms an optical spot. The optical spot moves in a longitudinal direction of the photoconductor drum 2030c as the polygon mirror 2104 rotates. Specifically, the optical spot scans the surface of the photoconductor drum 2030c. The direction in which the optical spot moves at this time is the "main-scanning direction" in the photoconductor drum 2030c and the direction in which the photoconductor drum 2030c rotates is the "sub-scanning direction" in the photoconductor drum 2030c.

The photoconductor drum 2030d is irradiated, via the scanning lens 2105d and the folding mirror 2106d, with the luminous flux from the cylindrical lens 2204d deflected by the polygon mirror 2104. This forms an optical spot. The optical spot moves in a longitudinal direction of the photoconductor drum 2030d as the polygon mirror 2104 rotates. Specifically, the optical spot scans the surface of the photoconductor drum 2030d. The direction in which the optical spot moves at this time is the "main-scanning direction" in the photoconductor drum 2030d and the direction in which the photoconductor drum 2030d rotates is the "sub-scanning direction" in the photoconductor drum 2030d.

The folding mirrors 2106a, 2106b, 2106c, 2106d, 2108b, and 2108c are disposed such that each has an optical path length between the polygon mirror 2104 and the corresponding photoconductor drum 2030 identical to each other and a position of incidence and an incident angle of the luminous flux at the corresponding photoconductor drum 2030 are identical to each other.

The optical system disposed along the optical path between the polygon mirror 2104 and the corresponding photoconductor drum 2030 is also referred to as a scanning optical system. In the embodiment, the scanning lens 2105a and the folding mirror 2106a constitute a scanning optical system for the K station. Similarly, the scanning lens 2105b and the two folding mirrors 2106b and 2108b constitute a scanning optical system for the C station. The scanning lens 2105c and the two folding mirrors 2106c and 2108c constitute a scanning optical system for the M station. The scanning lens 2105d and the folding mirror 2106d constitute a scanning optical system for the Y station. In each of these scanning optical systems, each of the scanning lenses 2105a, 2105b, 2105c, or 2105d may comprise a plurality of lenses.

Figure 8:
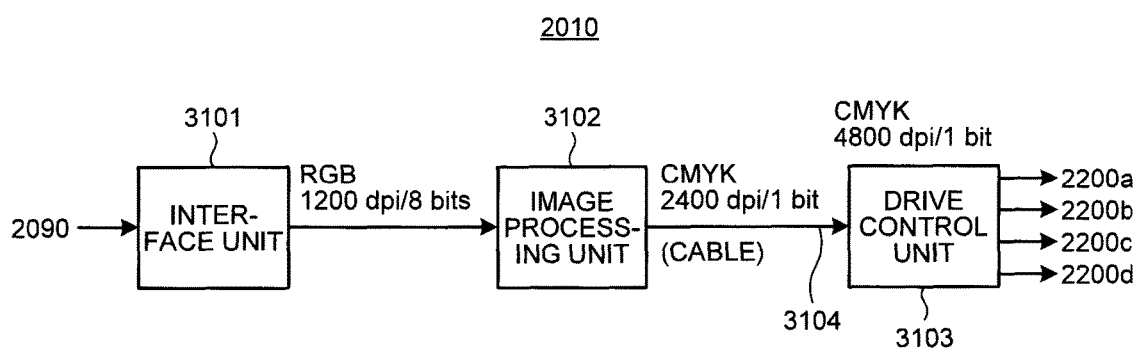
FIG. 8 is a diagram illustrating a configuration of an electrical system of the optical scanning device 2010.

FIG. 8 is a diagram illustrating a configuration of an electrical system of the optical scanning device 2010. The optical scanning device 2010 includes, as its electrical system, an interface unit 3101, an image processing unit 3102, and a drive control unit 3103.

The interface unit 3101 acquires from the printer control device 2090 image data transferred from the host device (e.g., a computer). The interface unit 3101 transfers the acquired image data to the image processing unit 3102 downstream thereof.

In the example, the interface unit 3101 acquires image data in the RGB format having a resolution of 1200 dpi and consisting of eight bits and transfers the image data to the image processing unit 3102.

The image processing unit 3102 acquires the image data from the interface unit 3101 and converts the image data to color image data corresponding to the printing system. Exemplarily, the image processing unit 3102 converts the image data in the RGB format to image data of the tandem type (CMYK format). In addition to the data format conversion, the image processing unit 3102 performs various types of image processing.

In this example, the image processing unit 3102 outputs image data in the CMYK format having a resolution of 2400 dpi and consisting of one bit. The image data output from the image processing unit 3102 may have any resolution other than 2400 dpi/bit. The image data output from the image processing unit 3102 may, for example, have a resolution of 1200 dpi and consist of two bits. The resolution of the image data output from the image processing unit 3102 is referred to as a first resolution.

In addition, the image processing unit 3102 generates tag information associated with each of the pixels of the image data having the first resolution (2400 dpi). The tag information indicates whether to perform image processing. The image processing unit 3102 then passes the generated tag information to the drive control unit 3103.

The drive control unit 3103 acquires from the image processing unit 3102 image data having the first resolution and converts the image data to color image data having a second resolution compatible with light source driving. The second resolution is higher than the first resolution. In this example, the drive control unit 3103 converts the image data to one in the CMYK format having a resolution of 4800 dpi and consisting of one bit.

The drive control unit 3103 changes details of the resolution conversion processing for each pixel according to details of the tag information. Specifically, the drive control unit 3103 identifies, in the image data having the first resolution, a target pixel to be subjected to image processing on the basis of the tag information. The drive control unit 3103 converts the target pixel to an image-processed pixel pattern having the second resolution. The drive control unit 3103 further converts the pixels other than the target pixel to a pixel pattern corresponding to the density of the pixels. Through the foregoing conversion, the drive control unit 3103 generates image data having the second resolution from the image data having the first resolution. Examples of the pixel pattern that has undergone image processing include a pattern for thinning a character or a line contained in the image and a pattern for thickening a white portion of a blank character or line contained in the image.

The drive control unit 3103 modulates the thus-generated image data having the second resolution to a clock signal that indicates pixel illumination timing, thereby generating an independent modulation signal for each color. The drive control unit 3103 drives and causes each of the light sources 2200a, 2200b, 2200c, and 2200d to emit light according to the modulation signal associated with each color. The drive control unit 3103 may integrally perform the resolution conversion processing and the modulation processing.

The drive control unit 3103 is exemplarily a single-chip integrated device disposed near the light sources 2200a, 2200b, 2200c, and 2200d. The image processing unit 3102 and the interface unit 3101 are disposed farther away from the light sources 2200a, 2200b, 2200c, and 2200d relative to the drive control unit 3103. The image processing unit 3102 and the drive control unit 3103 are connected by a cable 3104.

The optical scanning device 2010 having the arrangements as described above can form a latent image by causing the light sources 2200a, 2200b, 2200c, and 2200d to emit light corresponding to the image data.

Figure 9:
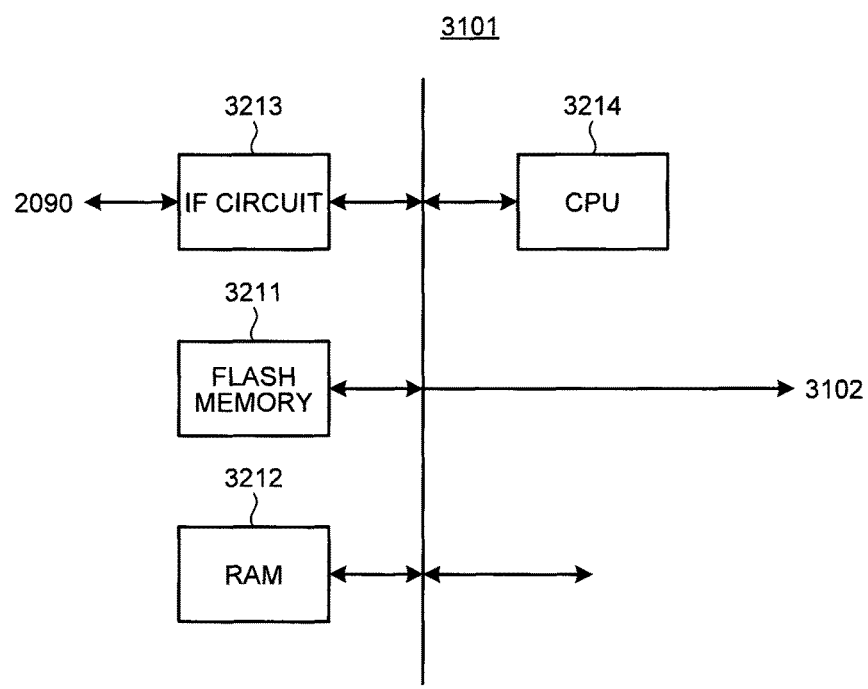
FIG. 9 is a diagram illustrating a configuration of an interface unit 3101.

FIG. 9 is a diagram illustrating a configuration of the interface unit 3101. The interface unit 3101 exemplarily includes a flash memory 3211, a RAM 3212, an IF circuit 3213, and a CPU 3214. The flash memory 3211, the RAM 3212, the IF circuit 3213, and the CPU 3214 are connected to each other by a bus.

The flash memory 3211 stores a program to be executed by the CPU 3214 and various types of data required by the CPU 3214 for executing the program. The RAM 3212 is a work storage area when the CPU 3214 is executing the program. The IF circuit 3213 performs bi-directional communications with the printer control device 2090.

The CPU 3214 operates according to the program stored in the flash memory 3211 to thereby generally control the optical scanning device 2010. The interface unit 3101 configured as described above transfers the image data (in the RGB format, 1200 dpi, eight bits) transmitted from the printer control device 2090 to the image processing unit 3102.

Figure 10:
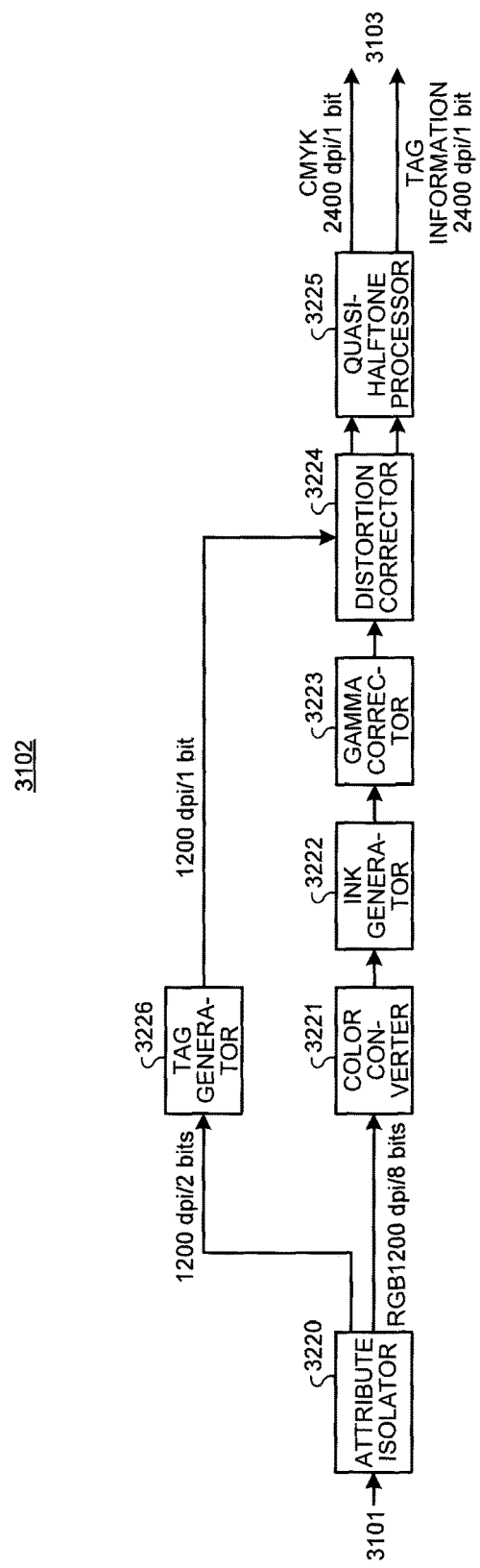
FIG. 10 is a diagram illustrating a configuration of an image processing unit 3102.

FIG. 10 is a diagram illustrating a configuration of the image processing unit 3102. The image processing unit 3102 includes an attribute isolator 3220, a color converter 3221, an ink generator 3222, a gamma corrector 3223, a distortion corrector 3224, a quasi-halftone processor 3225, and a tag generator 3226.

The attribute isolator 3220 receives input image data (RGB format, 1200 dpi, 8 bits) from the interface unit 3101. It is noted that attribute information is added to each of the pixels of the input image data. The attribute information indicates the type of an object that assumes a source of the area (pixel).

If, for example, the pixel is part of a character, the attribute information indicates an attribute that denotes "characters". If, for example, the pixel is part of a line drawing, the attribute information indicates an attribute that denotes "lines". If, for example, the pixel is part of a figure, the attribute information indicates an attribute that denotes "graphics". If, for example, the pixel is part of a photo, the attribute information indicates an attribute that denotes "photos".

The attribute isolator 3220 isolates the attribute information and image data from the input image data. The attribute isolator 3220 passes the isolated attribute information and image data to the tag generator 3226. The attribute isolator 3220 also passes the image data to the color converter 3221. The image data output from the attribute isolator 3220 is exemplarily image data in the RGB format having a resolution of 1200 dpi and consisting of eight bits. The attribute data output from the attribute isolator 3220 is exemplarily data having a resolution identical to that of the image data (1200 dpi) and consisting of two bits.

The color converter 3221 converts the 8-bit image data in the RGB format to 8-bit image data in a CMY format. The ink generator 3222 generates a black component to thereby generate image data in the CMYK format from the image data in the CMY format generated by the color converter 3221. The gamma corrector 3223 uses, for example, a table to subject the level of each color in the image data in the CMYK format generated by the ink generator 3222 to linear conversion.

The distortion corrector 3224 receives the image data from the gamma corrector 3223 and removes noise or distortion from the image data. At this time, the distortion corrector 3224 converts the resolution of 1200 dpi to 2400 dpi. The quasi-halftone processor 3225 receives the image data in the CMYK format having a resolution of 2400 dpi and consisting of eight bits from the distortion corrector 3224. The quasi-halftone processor 3225 reduces the number of gradations of the received 8-bit image data and outputs 1-bit image data. The quasi-halftone processor 3225 uses, for example, a dithering or error diffusion technique to process halftones, thereby reducing the number of gradations of the 8-bit image data to generate the 1-bit image data. The quasi-halftone processor 3225 then transmits the 1-bit image data having the first resolution (2400 dpi) to the drive control unit 3103.

The tag generator 3226 generates tag information that indicates whether to perform image processing in the drive control unit 3103 at a downstream stage by associating the tag information with each of the pixels of the image data having 1200 dpi. The tag generator 3226 selects, on the basis of the attribute information and the pixel value of the image data, whether to add the tag information that indicates performing the image processing or to add the tag information that indicates not performing the image processing.

Exemplarily, the tag generator 3226 adds the tag information that indicates performing the image processing to a pixel that has attribute information denoting a character or a line and that is near an edge of the character or line.

The tag generator 3226, for example, adds the tag information that indicates performing the image processing to pixels of a black portion that forms edges of the character or line. Alternatively, the tag generator 3226 adds the tag information that indicates performing the image processing to pixels that form edges of a peripheral black portion of a blank character or a line. Still alternatively, the tag generator 3226 adds the tag information that indicates performing the image processing to pixels of a white portion that forms edges of a blank character or line. Specific examples of the pixels to which the tag information is added will be described in detail later.

The tag information generated by the tag generator 3226 is transferred onto the drive control unit 3103 via the distortion corrector 3224 and the quasi-halftone processor

3225. When increasing the resolution of the image data from 1200 dpi to 2400 dpi, the distortion corrector 3224 and the quasi-halftone processor 3225 increase the resolution of the tag information also from 1200 dpi to 2400 dpi. This increase in the resolution enables the image processing unit 3102 to generate the tag information associated with each pixel of the image data having the first resolution (2400 dpi) and transmit the tag information to the drive control unit 3103.

The image processing unit 3102 may output tag information having a resolution equal to or lower than the first resolution (e.g., 1200 dpi) if the tag information is associated with each pixel of the image data having the first resolution (2400 dpi). If, for example, the tag information has a resolution of 1200 dpi and the image data has a resolution of 2400 dpi, one piece of tag information is associated with four pixels.

The image processing unit 3102 may be implemented in part or in whole by hardware or by a CPU executing a software program.

Figure 11:
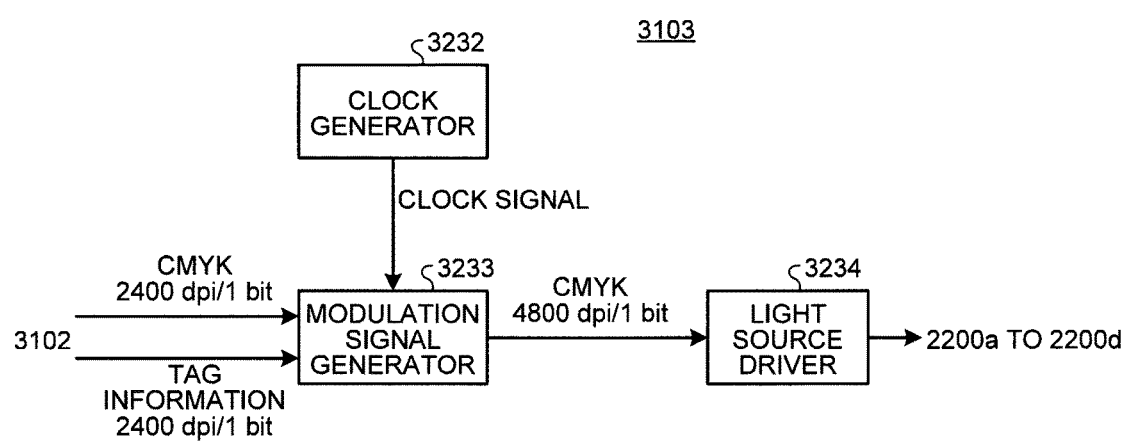
FIG. 11 is a diagram illustrating a configuration of a drive control unit 3103.

FIG. 11 is a diagram illustrating a configuration of the drive control unit 3103. The drive control unit 3103 includes a clock generator 3232, a modulation signal generator 3233, and a light source driver 3234.

The clock generator 3232 generates a clock signal that indicates the pixel illumination timing. The clock signal can modulate image data at a resolution corresponding to 4800 dpi.

The modulation signal generator 3233 acquires the image data having the first resolution from the image processing unit 3102. The modulation signal generator 3233 generates image data having the second resolution higher than the first resolution on the basis of the image data having the first resolution. In this example, the modulation signal generator 3233 generates 1-bit image data in the CMYK format having a resolution of 4800 dpi on the basis of 1-bit image data in the CMYK format having a resolution of 2400 dpi. The modulation signal generator 3233 modulates the image data having the second resolution to a clock signal and generates a modulation signal for forming a 4800-dpi image.

The modulation signal generator 3233 acquires tag information from the image processing unit 3102. The modulation signal generator 3233 then changes over specific details of resolution conversion processing for each pixel according to details of the tag information.

The light source driver 3234 receives the modulation signal according to the image data having the second resolution. The light source driver 3234 drives a corresponding one of the light sources 2200a, 2200b, 2200c, and 2200d according to the independent modulation signal for each color output from the modulation signal generator 3233. This enables the light source driver 3234 to cause each of the light sources 2200a, 2200b, 2200c, and 2200d to emit light with intensity corresponding to the modulation signal.

Figure 12:
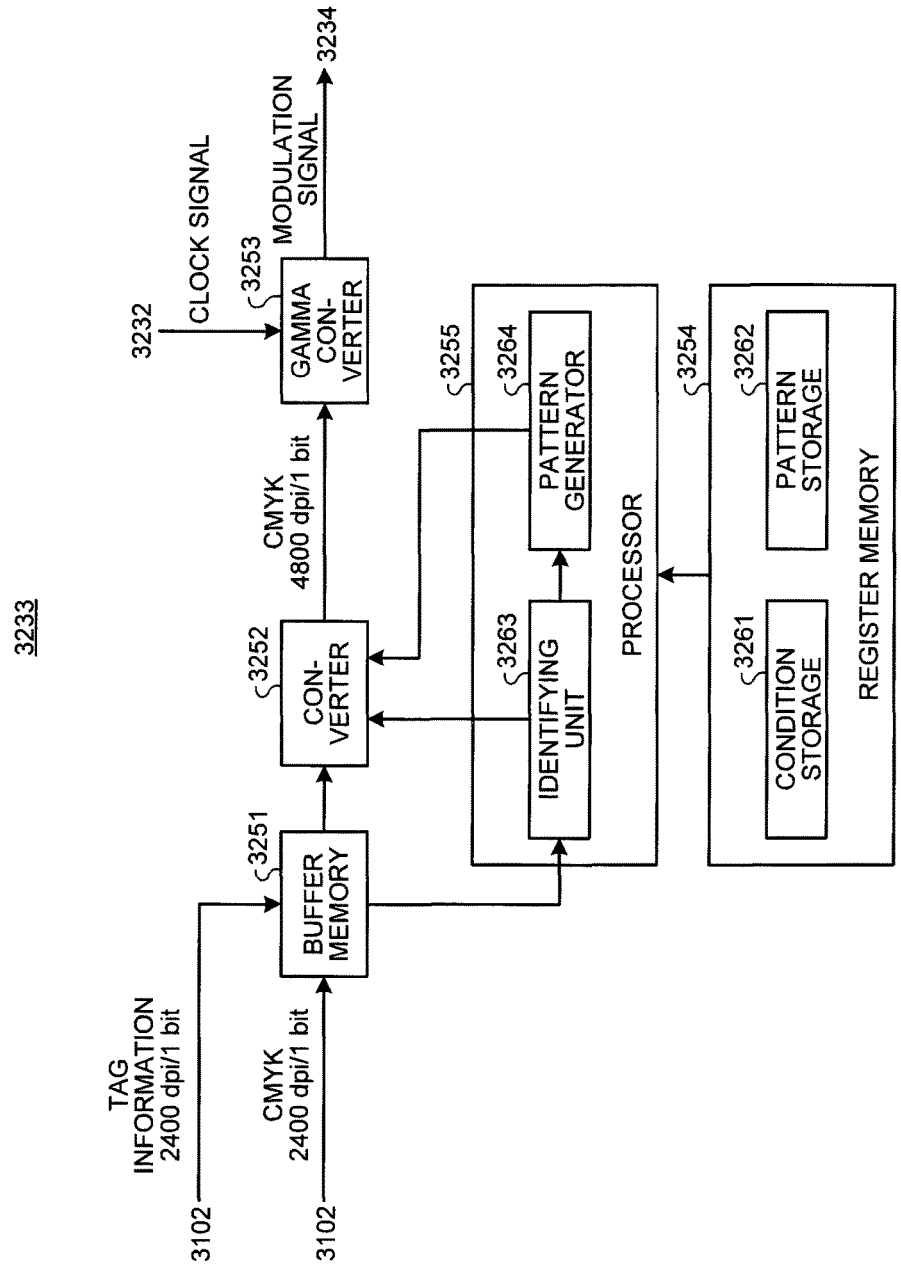
FIG. 12 is a diagram illustrating a configuration of a modulation signal generator 3233.

FIG. 12 is a diagram illustrating a configuration of the modulation signal generator 3233. The modulation signal generator 3233 includes a buffer memory 3251, a converter 3252, a gamma converter 3253, a register memory 3254, and a processor 3255.

The buffer memory 3251 stores the image data having the first resolution (2400 dpi/bit) and the tag information having the first resolution (2400 dpi/bit) transmitted from the image processing unit 3102. The buffer memory 3251 stores the image in units of a main-scanning line and passes the stored data to a circuit at a downstream stage in response to reading therefrom.

The converter 3252 converts the image data having the first resolution to the image data having the second resolution higher than the first resolution. In the embodiment, the converter 3252 divides a 2400 dpi/bit-pixel into two each in the main-scanning direction and the sub-scanning direction to thereby convert the image data having the first resolution to the image data having a resolution of 4800 dpi/bit.

When converting a certain pixel (a pixel of interest), the converter 3252 receives information on whether the pixel of interest is a target pixel from the processor 3255. If the pixel of interest is the target pixel, the converter 3252 replaces the pixel of interest with the image-processed pixel pattern having the second resolution. In this case, the converter 3252 receives the image-processed pixel pattern from the processor 3255.

If the pixel of interest is not the target pixel, the converter 3252 replaces the pixel of interest with a pixel pattern according to a density of the pixel of interest. Exemplarily, to convert image data having a resolution of 2400 dpi/bit to image data having a resolution of 4800 dpi/bit, the converter 3252 replaces the pixel of interest having a pixel value of 1 with a pixel pattern with a value of 1 set in each of all four pixel values. In addition, the converter 3252 replaces the pixel of interest having a pixel value of 0 with a pixel pattern with a value of 0 set in each of all four pixel values. The converter 3252 passes the image data having the second resolution after the conversion to the gamma converter 3253.

The gamma converter 3253 receives the image data having the second resolution. The gamma converter 3253 then modulates the received image data to a clock signal and performs level conversion to suit a level to the characteristics of the light source 2200, thereby generating a modulation signal. The gamma converter 3253 transmits the generated modulation signal to the light source driver 3234.

The register memory 3254 includes a condition storage 3261 and a pattern storage 3262. The condition storage 3261 stores an algorithm for determining whether each pixel of the image data having the first resolution is a target pixel subjected to image processing. The pattern storage 3262 stores a plurality of image-processed pixel patterns having the second resolution to replace a pixel of interest if the pixel of interest is the target pixel. The register memory 3254 may, for example, be a ROM or an EPROM and various types of information are written in the register memory 3254 from an external device upon shipment from a factory or during an initial setting procedure, for example.

The processor 3255 includes an identifying unit 3263 and a pattern generator 3264. The identifying unit 3263 determines whether a pixel of interest is a target pixel. The identifying unit 3263 exemplarily determines whether the pixel of interest is the target pixel on the basis of the tag information, density of the pixel of interest, and density of pixels around the pixel of interest and according to a determination condition stored in the condition storage 3261. The identifying unit 3263 then passes to the converter 3252 a result of the determination made as to whether the pixel to be converted by the converter 3252 is the target pixel.

The pattern generator 3264 selects, when the pixel of interest is determined to be the target pixel, either one of the image-processed pixel patterns stored in the pattern storage 3262. The pattern generator 3264 passes the selected image-processed pixel pattern to the converter 3252.

The processor 3255 may, for example, be a data processing device such as a CPU. The processor 3255 executes a program written in advance in, for example, a ROM to thereby function as the identifying unit 3263 and the pattern generator 3264.

Method for Adding Tag Information, Method for Identifying Target Pixel, and Method for Generating Pixel Pattern The following specifically describes a method for adding tag information, a method for identifying a target pixel, and a method for generating a pixel pattern.

Thinning Process

When the drive control unit 3103 converts the image data having the first resolution to the image data having the second resolution, the color printer 2000 can thin a character or line portion drawn in black (portion to be irradiated with light so that toner adheres thereto) within the image. The following describes a process that thins a character or a line drawing.

Figure 13:
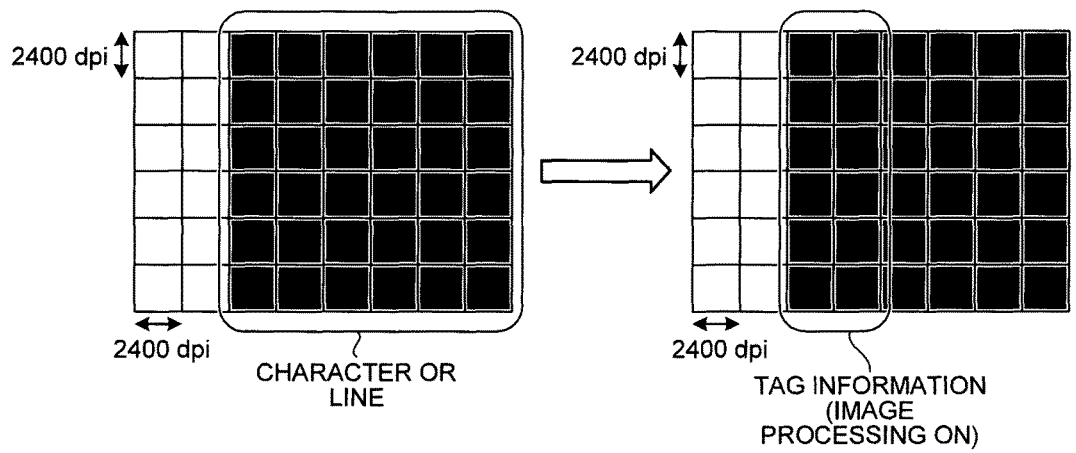
FIG. 13 is a diagram illustrating an area indicating a character or a line, and pixel positions to which tag information is added when a character or a line is thinned.

FIG. 13 is a diagram illustrating an area that indicates a character or a line, and pixel positions to which tag information is added when a character or a line is thinned. When a character or a line is thinned, the tag generator 3226 adds tag information that indicates performing the image processing (image processing ON tag information) to a pixel that satisfies all of a first condition, a second condition, and a third condition listed below in the image data having the first resolution.

First condition: A pixel having attribute information that indicates a character or a line, or a pixel adjacent to the pixel having attribute information that indicates a character or a line Second condition: A pixel indicating a black portion (e.g., an 8-bit pixel having a value of 255)

Third condition: A pixel having a difference in value of a predetermined threshold (dth) or more from an adjacent pixel The foregoing arrangement enables the tag generator 3226 to add the tag information that indicates performing the image processing to pixels that form an edge of a character or a line (black portion pixels).

It is noted that, in the embodiment, the tag generator 3226 adds the tag information in units of a pixel of 1200 dpi on the basis of the attribute information added to the input image data having a resolution of 1200 dpi. The distortion corrector 3224 at a stage downstream of the tag generator 3226 then increases the resolution of the tag information from 1200 dpi to 2400 dpi. Thus, in the example illustrated in FIG. 13, the tag information is added in units of four pixels of 2400 dpi (two pixels each in the main-scanning direction and the sub-scanning direction).

Figure 14:
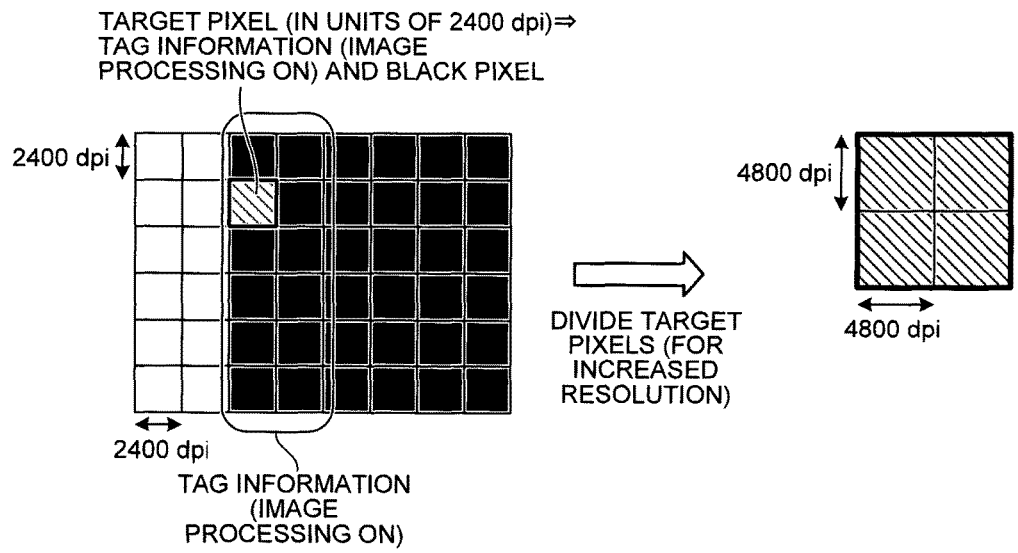
FIG. 14 is a diagram illustrating an exemplary position of a target pixel and an exemplary target pixel that has been processed to render a higher resolution when a character or a line is thinned.

FIG. 14 is a diagram illustrating an exemplary position of a target pixel and an exemplary target pixel that has been processed to render a higher resolution when a character or a line is thinned. When converting the image data having the first resolution (2400 dpi) to the image data having the second resolution (4800 dpi), the converter 3252 divides each pixel having the first resolution into two each in the main-scanning direction and the sub-scanning direction to thereby generate four pixels having the second resolution (4800 dpi).

The identifying unit 3263 determines, for each of the pixels of interest for which resolution is to be increased, whether the pixel of interest is the target pixel on the basis of the pixel value of the pixel of interest and the tag information added to the pixel of interest. Specifically, if the tag information that indicates performing the image processing (image processing ON tag information) is added to the pixel and the pixel has a pixel value indicating black (e.g., the pixel value is 1), then identifying unit 3263 determines that the pixel of interest is the target pixel. In the example illustrated in FIG. 14, all pixels to which the tag information that indicates performing the image processing is added are determined to be the target pixels.

FIG. 15 is a diagram illustrating criteria for selecting a pixel pattern when a character or a line is thinned.

In the example, the pattern generator 3264 generates a pixel pattern that narrows a black portion of a character or a line according to shades of pixels around the target pixel. Exemplarily, the pattern generator 3264 acquires values of eight pixels around the target pixel to thereby determine a direction in which the black portion is to be narrowed. Specifically, as illustrated in the decision-making expressions in FIG. 15, the pattern generator 3264 calculates a difference in shades in the vertical direction and a-difference in shades in the lateral direction.

When the density of the upper side of the eight pixels is high, the pattern generator 3264 selects a pixel pattern that turns off the light of lower-half pixels within the target pixels (lower side light off). When the density of the lower side of the eight pixels is high, the pattern generator 3264 selects a pixel pattern that turns off the light of upper-half pixels within the target pixels (upper side light off). When the density of the upper side of the eight pixels is equivalent to that of the lower side of the eight pixels, the pattern generator 3264 selects a pixel pattern that performs identical light control for the upper and lower sides within the target pixels (no vertical processing).

When the density of the left-hand side of the eight pixels is high, the pattern generator 3264 selects a pixel pattern that turns off the light of right-hand half pixels within the target pixels (right-hand side light off). When the density of the right-hand side of the eight pixels is high, the pattern generator 3264 selects a pixel pattern that turns off the light of left-hand side half pixels within the target pixels (left-hand side light off). When the density of the right-hand side of the eight pixels is equivalent to that of the left-hand side of the eight pixels, the pattern generator 3264 selects a pixel pattern that performs identical light control for the right-hand and left-hand sides within the target pixels (no lateral processing).

FIG. 16 is diagram illustrating exemplary pixel patterns that replace the target pixels when a character or a line is thinned. Exemplarily, the pattern generator 3264 selects either one of the image-processed pixel patterns registered in advance.

In the example, the pattern generator 3264 exemplarily selects either one of the nine pixel patterns illustrated in FIG. 16 according to the criteria illustrated in FIG. 15.

Specifically, for right-hand side light off and lower side light off, the pattern generator 3264 selects pixel pattern (a) that lights up a single pixel in the upper left. For right-hand side light off and no vertical processing, the pattern generator 3264 selects pixel pattern (b) that lights up the two pixels on the left-hand side. For right-hand side light off and upper side light off, the pattern generator 3264 selects pixel pattern (c) that lights up a single pixel in the lower left.

Similarly, for no lateral processing and lower side light off, the pattern generator 3264 selects pixel pattern (d) that lights up the upper two pixels. For no lateral processing and no vertical processing, the pattern generator 3264 selects pixel pattern (e) that lights up all four pixels. For no lateral processing and upper side light off, the pattern generator 3264 selects pixel pattern (f) that lights up the lower two pixels.

For left-hand side light off and lower side light off, the pattern generator 3264 selects pixel pattern (g) that lights up a single pixel in the upper right. For left-hand side light off and no vertical processing, the pattern generator 3264 selects pixel pattern (h) that lights up the two pixels on the right-hand side. For left-hand side light off and upper side light off, the pattern generator 3264 selects pixel pattern (i) that lights up a single pixel in the lower right.

Figure 17:
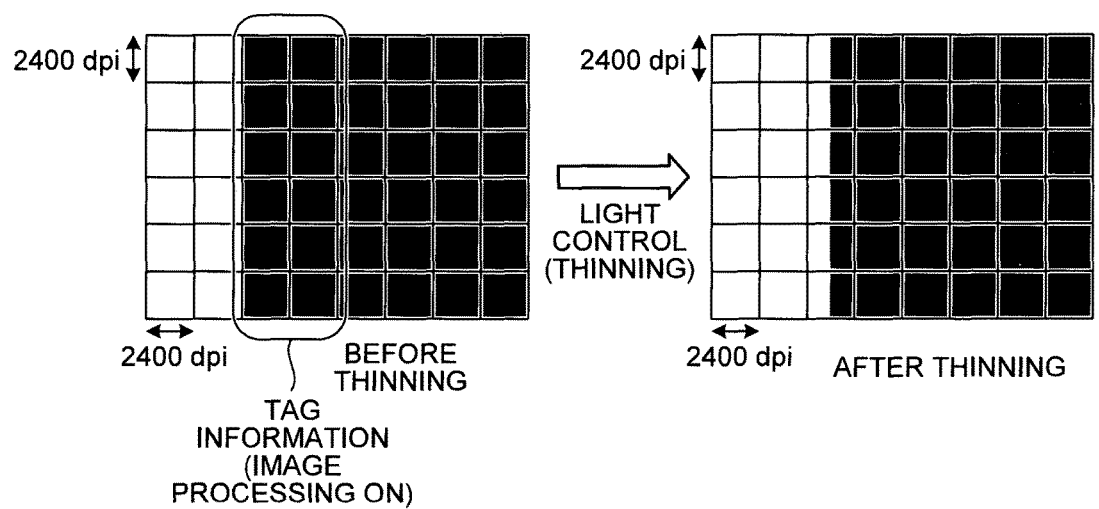
FIG. 17 is a diagram illustrating an image before thinning and an image after thinning.

FIG. 17 is a diagram illustrating an image before thinning and an image after thinning. The converter 3252 replaces the target pixel with a single pixel pattern selected by the pattern generator 3264 from among the nine pixel patterns illustrated in FIG. 16. As a result, the converter 3252 can generate image data having the second resolution in which the black area on the edge of the character or the line has been narrowed to achieve thinning.

Figure 18:
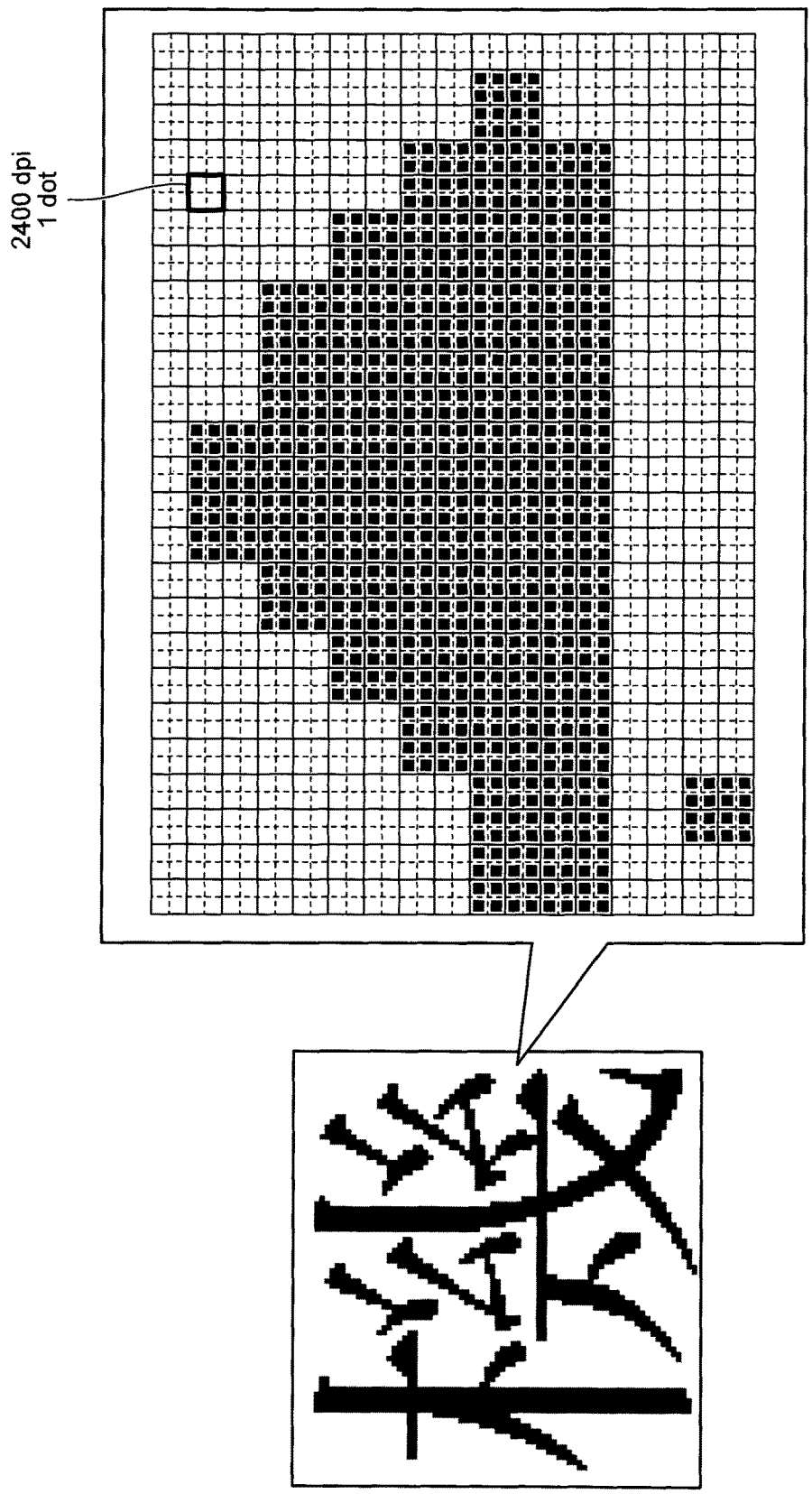
FIG. 18 is a diagram illustrating an exemplary character that is yet to be subjected to a thinning process.
Figure 19:
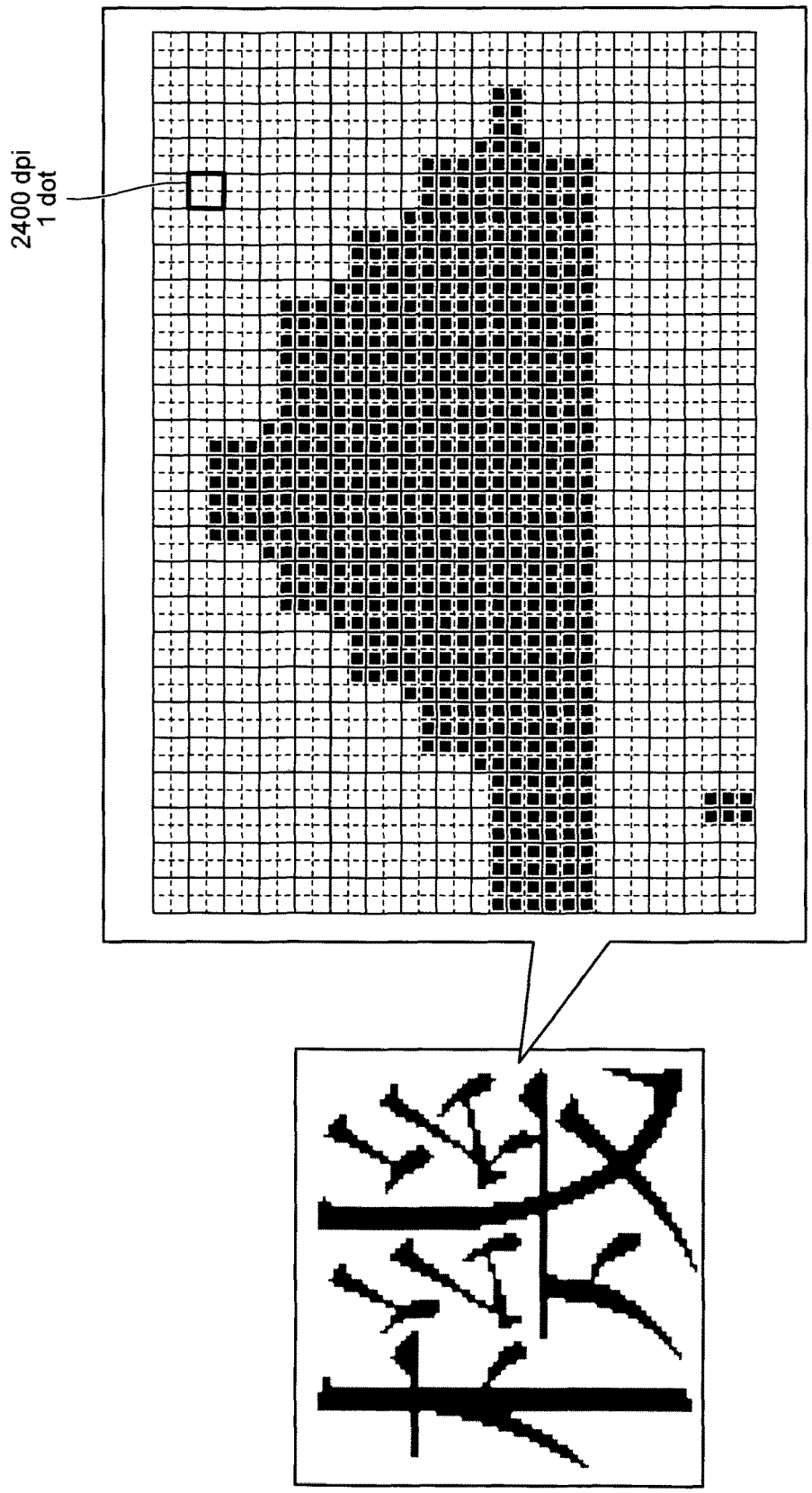
FIG. 19 is a diagram illustrating an exemplary character that represents the same character as that illustrated in FIG. 18 subjected to the thinning process.

FIG. 18 is a diagram illustrating an exemplary character that is yet to be subjected to the thinning process. FIG. 19 is a diagram illustrating an exemplary character that represents the same character as that illustrated in FIG. 18 after subjected to the thinning process.

A comparison of FIG. 18 with FIG. 19 reveals that minute portions of the character are thinned. As such, the color printer 2000 can thin a character or line portion within the image when the drive control unit 3103 converts the image data having the first resolution to the image data having the second resolution. Thus, the color printer 2000 can improve reproducibility of characters by thinning a black portion (portion to be irradiated with light so that toner adheres thereto) with respect to a minute character or line.

Thickening Process for Blank Character or Line

When causing the drive control unit 3103 to convert the image data having the first resolution to the image data having the second resolution, the color printer 2000 can thicken a portion of a blank character or line. The following describes a process for thickening a blank character or line drawing.

To subject a blank character or line to thickening process, the tag generator 3226 adds the tag information that indicates performing the image processing (image processing ON tag information) to all pixels that satisfy the first condition, the second condition, and the third condition as described with reference to FIG. 13. This step enables the tag generator 3226 to add the tag information that indicates performing the image processing to pixels that constitute the edges of the black portion around the blank character or line.

When a blank character or line is subjected to the thickening process, if the tag information that indicates performing the image processing (image processing ON tag information) is added to the pixel and the pixel has a pixel value indicating black (e.g., the pixel value is 1), then identifying unit 3263 determines that the pixel of interest is a target pixel as described with reference to FIG. 14.

The pattern generator 3264 selects a pixel pattern from among the pixel patterns illustrated in FIG. 16 according to the criteria illustrated in FIG. 15. This step enables the pattern generator 3264 to generate a pixel pattern that widens a white portion of a blank character or line (specifically, narrows a surrounding black portion).

The converter 3252 then replaces the target pixel with the pixel pattern selected by the pattern generator 3264. This step enables the converter 3252 to generate the image data having the second resolution in which the white area of the blank character or line is widened to achieve thickening.

Figure 20:
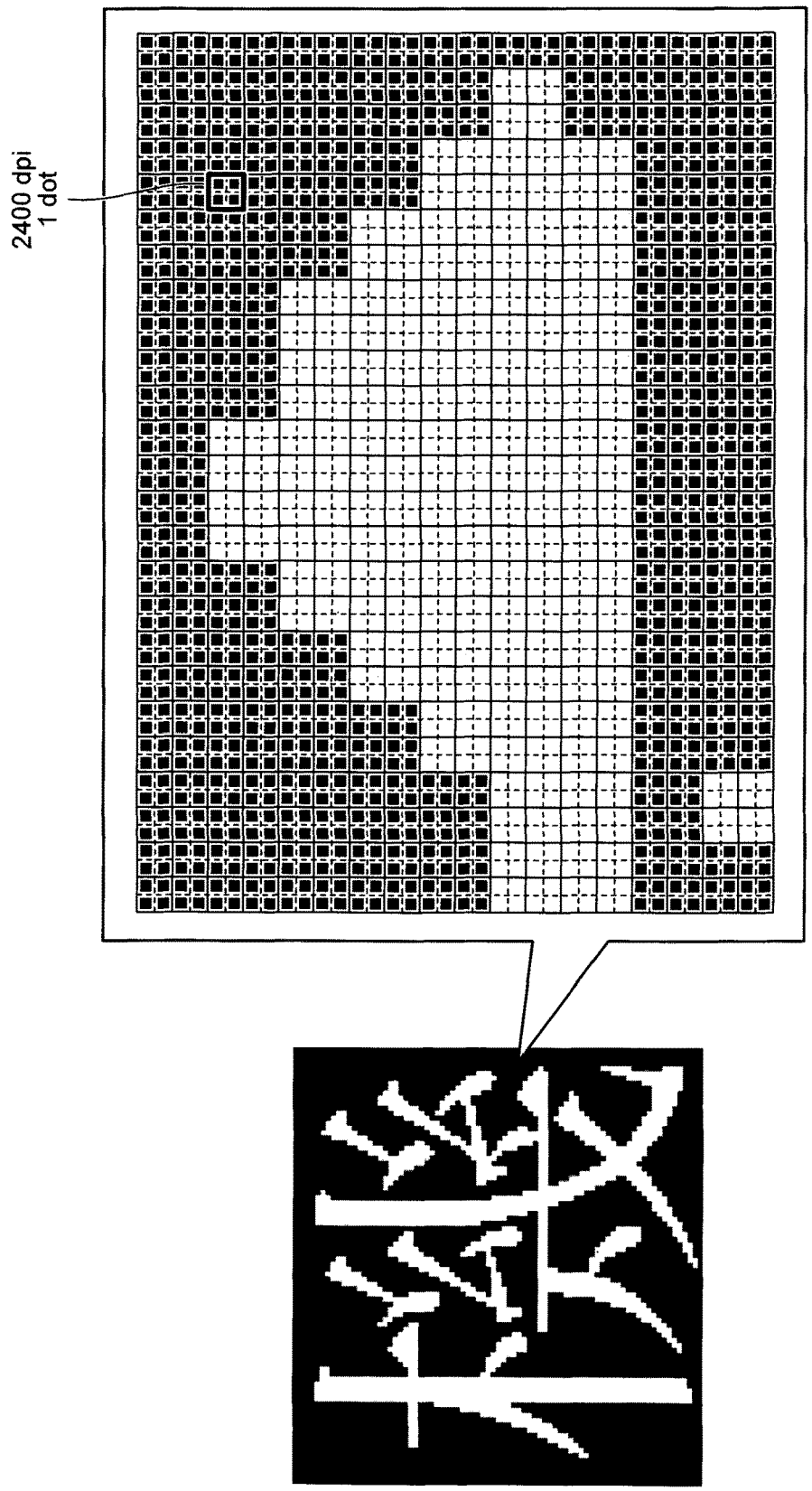
FIG. 20 is a diagram illustrating an exemplary character that is yet to be subjected to the thickening process.
Figure 21:
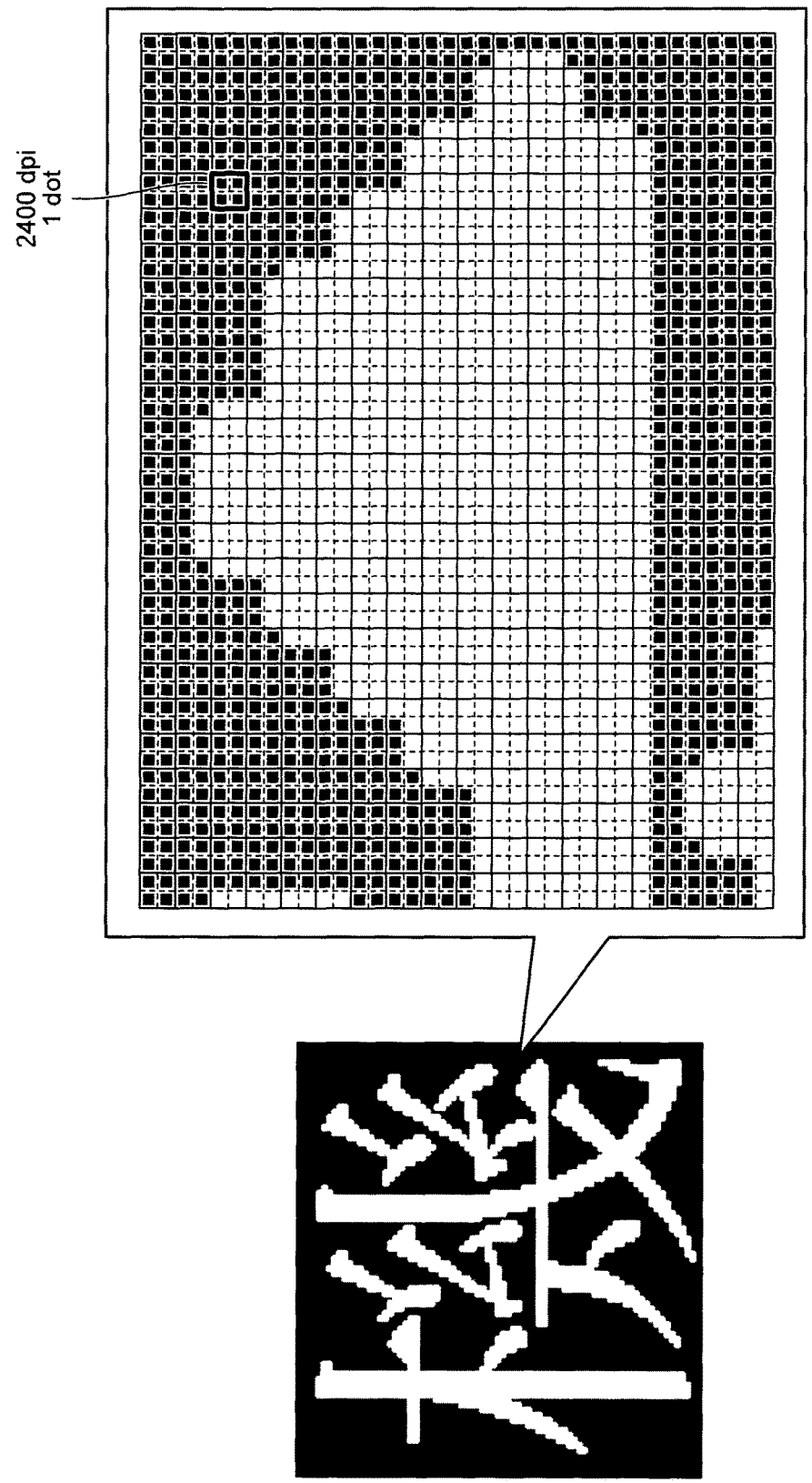
FIG. 21 is a diagram illustrating an exemplary character that represents the same character as that illustrated in FIG. 20 subjected to the thickening process.

FIG. 20 is a diagram illustrating an exemplary character that is yet to be subjected to the thickening process. FIG. 21 is a diagram illustrating an exemplary character that represents the same character as that illustrated in FIG. 20 subjected to the thickening process.

A comparison of FIG. 20 with FIG. 21 reveals that minute portions of the blank character are thickened. As such, the color printer 2000 can thicken a blank character or line portion within the image when the drive control unit 3103 converts the image data having the first resolution to the image data having the second resolution. Thus, the color printer 2000 can improve reproducibility by thickening a white portion (portion to which toner does not adhere) with respect to a minute blank character or line to thereby eliminate a collapsed fine line.

Pixel Pattern Modification

Figure 22:
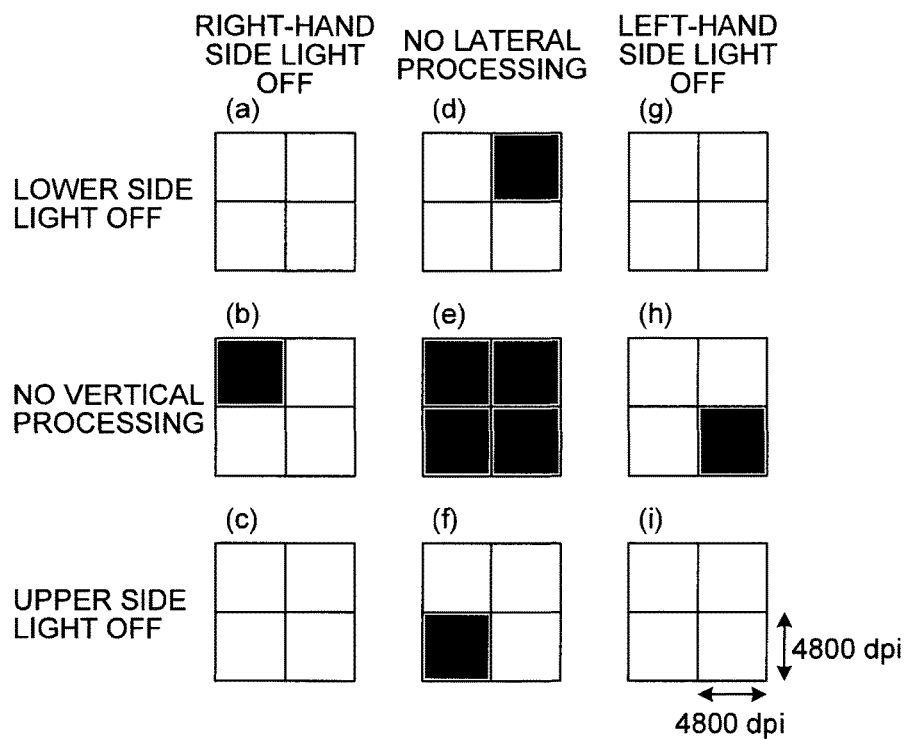
FIG. 22 that includes parts (a) to (i) is diagram illustrating other exemplary pixel patterns that replace target pixels when a character or a line is thinned or when a blank character or line is thickened.

FIG. 22 is diagram illustrating other exemplary pixel patterns that replace target pixels when a character or a line is thinned or when a blank character or line is thickened.

The pattern generator 3264 may select any of the pixel patterns illustrated in FIG. 22, instead of the pixel patterns illustrated in FIG. 16.

Specifically, for right-hand side light off and lower side light off, the pattern generator 3264 selects pixel pattern (a) that turns off all pixels. For right-hand side light off and no vertical processing, the pattern generator 3264 selects pixel pattern (b) that lights up a single pixel in the upper left. For right-hand side light off and upper side light off, the pattern generator 3264 selects pixel pattern (c) that turns off all pixels.

Similarly, for no lateral processing and lower side light off, the pattern generator 3264 selects pixel pattern (d) that lights up a single pixel in the upper right. For no lateral processing and no vertical processing, the pattern generator 3264 selects pixel pattern (e) that lights up all four pixels. For no lateral processing and upper side light off, the pattern generator 3264 selects pixel pattern (f) that lights up a single pixel in the lower left.

For left-hand side light off and lower side light off, the pattern generator 3264 selects pixel pattern (g) that turns off all pixels. For left-hand side light off and no vertical processing, the pattern generator 3264 selects pixel pattern (h) that lights up a single pixel in the lower right. For left-hand side light off and upper side light off, the pattern generator 3264 selects pixel pattern (i) that turns off all pixels.

Figure 23:
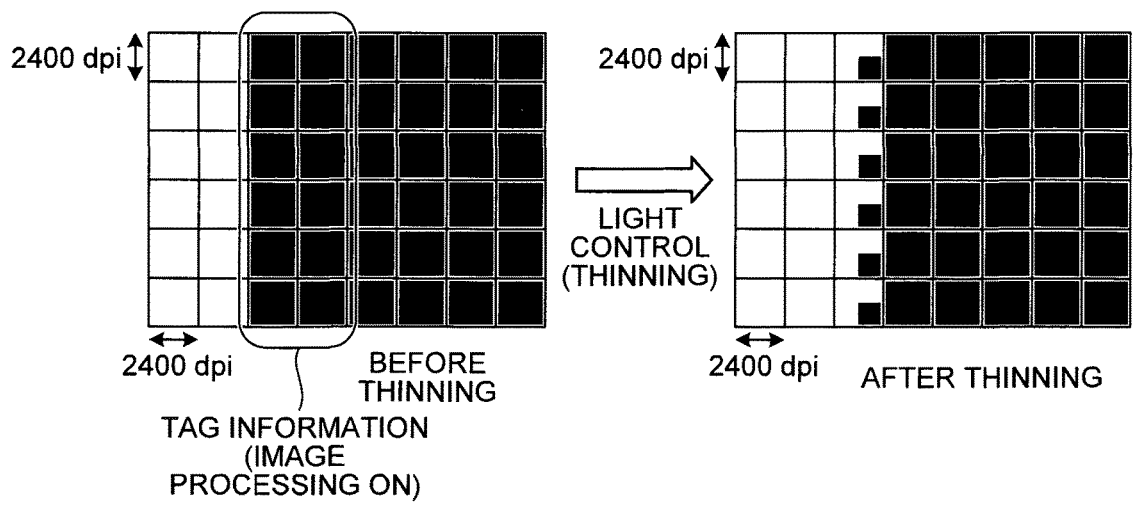
FIG. 23 is a diagram illustrating an image before thinning and an image after thinning (thickening) using the pixel pattern illustrated in FIG. 22.

FIG. 23 is a diagram illustrating an image before thinning and an image after thinning (thickening) using the pixel pattern illustrated in FIGS. 22A to 22I. The converter 3252 replaces the target pixel with a single pixel pattern selected by the pattern generator 3264 from among the nine pixel patterns illustrated in FIGS. 22A to 22I. As a result, the converter 3252 can generate image data having the second resolution in which the black area on the edges of the character or the line has been narrowed to achieve thinning or the white portion in the blank character or line has been widened to achieve thickening.

As such, by selecting the pixel pattern illustrated in FIG. 22, the color printer 2000 can narrow the black portion of the character or line with an even greater intensity (or widen the white portion of the blank character or line with an even greater intensity) as illustrated in FIG. 23.

Modification of Thickening Process for Blank Character or Line

Figure 24:
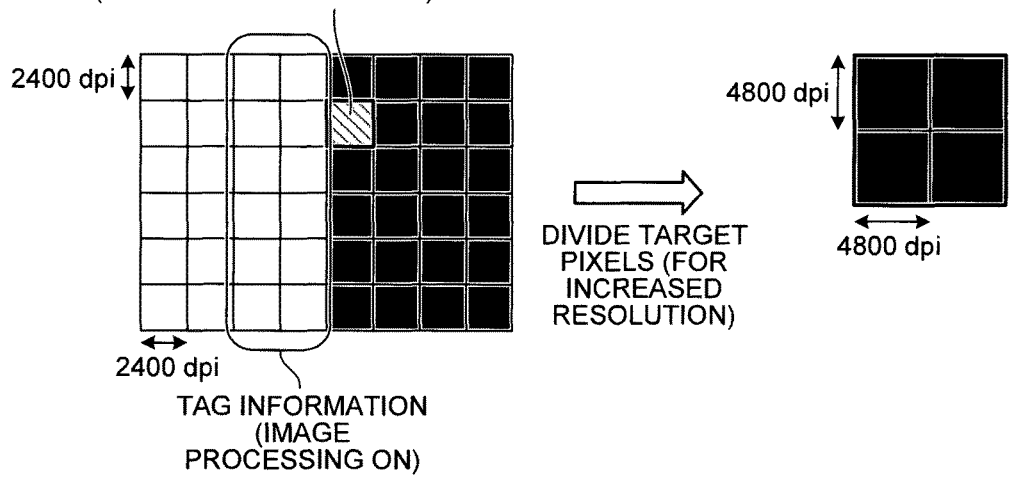
FIG. 24 is a diagram illustrating another exemplary position of a target pixel and another exemplary target pixel that has been processed to render a higher resolution when a blank character or line is thickened.

FIG. 24 is a diagram illustrating another exemplary position of a target pixel and another exemplary target pixel that has been processed to render a higher resolution when a blank character or line is thickened.

When a blank character or line is thickened, the tag generator 3226 may add tag information that indicates performing the image processing (image processing ON tag information) to a pixel that satisfies all of a fourth condition, a fifth condition, and a sixth condition listed below in the image data having the first resolution.

Fourth condition: A pixel having attribute information that indicates a character or a line Fifth condition: A pixel indicating a white portion (e.g., an 8-bit pixel having a value of 0)

Sixth condition: A pixel having a difference in value of a predetermined threshold (dth) or more from an adjacent pixel The foregoing arrangement enables the tag generator 3226 to add the tag information that indicates performing the image processing to pixels that form an edge of a blank character or line (blank portion pixels).

When converting the image data having the first resolution (2400 dpi) to the image data having the second resolution (4800 dpi), the converter 3252 divides each pixel having the first resolution into two each in the main-scanning direction and the sub-scanning direction to thereby generate four pixels having the second resolution (4800 dpi).

The identifying unit 3263 then determines that a pixel of interest is the target pixel, when the pixel of interest is adjacent to the pixel to which the tag information that indicates performing the image processing (image processing ON tag information) is added and the pixel value of the adjacent pixel indicates white (e.g., the pixel value is 0).

The pattern generator 3264 selects a pixel pattern from among the pixel patterns illustrated in FIG. 16 according to the criteria illustrated in FIG. 15. This step enables the pattern generator 3264 to generate a pixel pattern that widens a white portion of a blank character or line (specifically, narrows a surrounding black portion).

Figure 25:
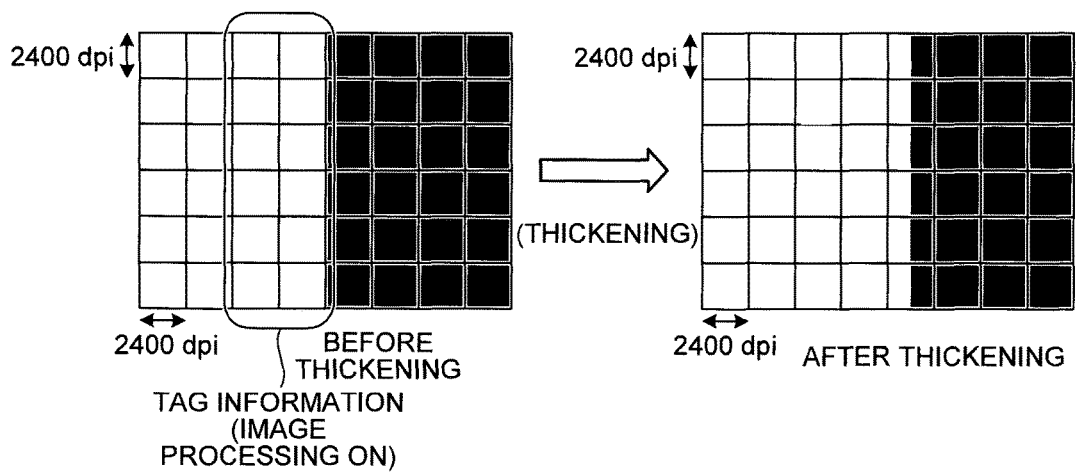
FIG. 25 is a diagram illustrating an image before thickening and an image after thickening.

FIG. 25 is a diagram illustrating an image before thickening and an image after thickening. The converter 3252 replaces the target pixel with the pixel pattern selected by the pattern generator 3264. As a result, the converter 3252 can generate image data having the second resolution in which the white area in the blank character or line has been widened to achieve thickening.

In the thickening process according to the modification, the tag information that indicates performing the image processing is added to the white pixel that satisfies the fourth to sixth conditions. In contrast, in the thinning process, the tag information that indicates performing the image processing is added to the black pixel that satisfies the first to third conditions.

Thus, to thin a character or line, the tag generator 3226 may add the tag information that indicates performing the image processing (image processing ON tag information) to the pixel that satisfies all of the first to third conditions described above. To thicken a blank character or line, the tag generator 3226 may add the tag information that indicates performing the image processing (image processing ON tag information) to the pixel that satisfies all of the fourth to sixth conditions described above.

In this case, the pattern generator 3264 can determine whether the process is for thinning or thickening by detecting the value of the pixel to which the tag information is added. This determination allows the pattern generator 3264 to change the pixel pattern to be selected depending on whether the processing is for thinning or thickening. Thus, the pattern generator 3264 according to the modification can change the intensity with which to narrow or widen the line depending on whether the processing is for thinning or thickening.

Smoothing Process

Figure 26:
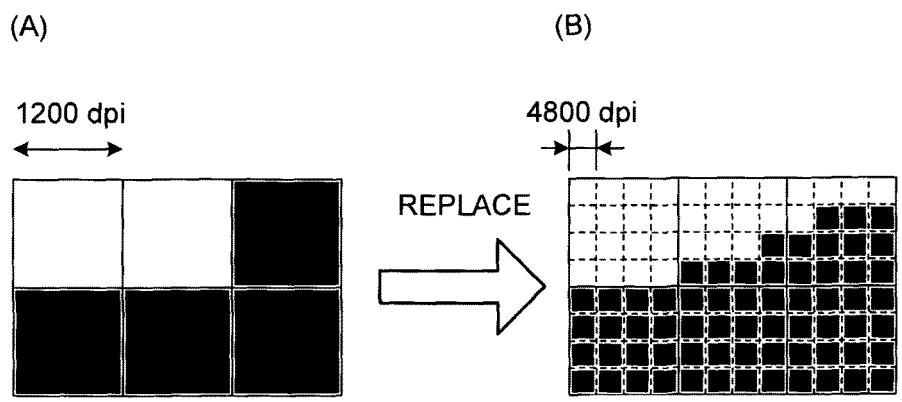
FIG. 26 that includes part (A) and (B) is diagram illustrating an exemplary pixel pattern having a predetermined first resolution (1200 dpi) and an exemplary pixel pattern having a predetermined second resolution (4800 dpi), respectively.

FIG. 26 is diagram illustrating an exemplary pixel pattern having a predetermined first resolution (1200 dpi) and an exemplary pixel pattern having a predetermined second resolution (4800 dpi).

When converting the first resolution to the second resolution, the converter 3252 may perform the resolution conversion in units of a plurality of pixels. In this case, the tag generator 3226 adds the tag information that indicates performing the image processing to a plurality of pixels that constitute a predetermined shape. The tag generator 3226, for example, adds the tag information that indicates performing the image processing to a unit of 3-by-2-dot pixels at 1200 dpi as illustrated in the part (A) in FIG. 26.

The identifying unit 3263 identifies, as the target pixel, each of the pixels to which the tag information indicating performing the image processing is added and that are included in an area that matches the predetermined shape. The pattern generator 3264 selects the image-processed pixel pattern having the second resolution corresponding to the target pixels within the predetermined shape. For example, the tag generator 3226 selects a 12-by-8-dot pixel pattern at 4800 dpi as illustrated in part (B) in FIG. 26.

Figure 27:
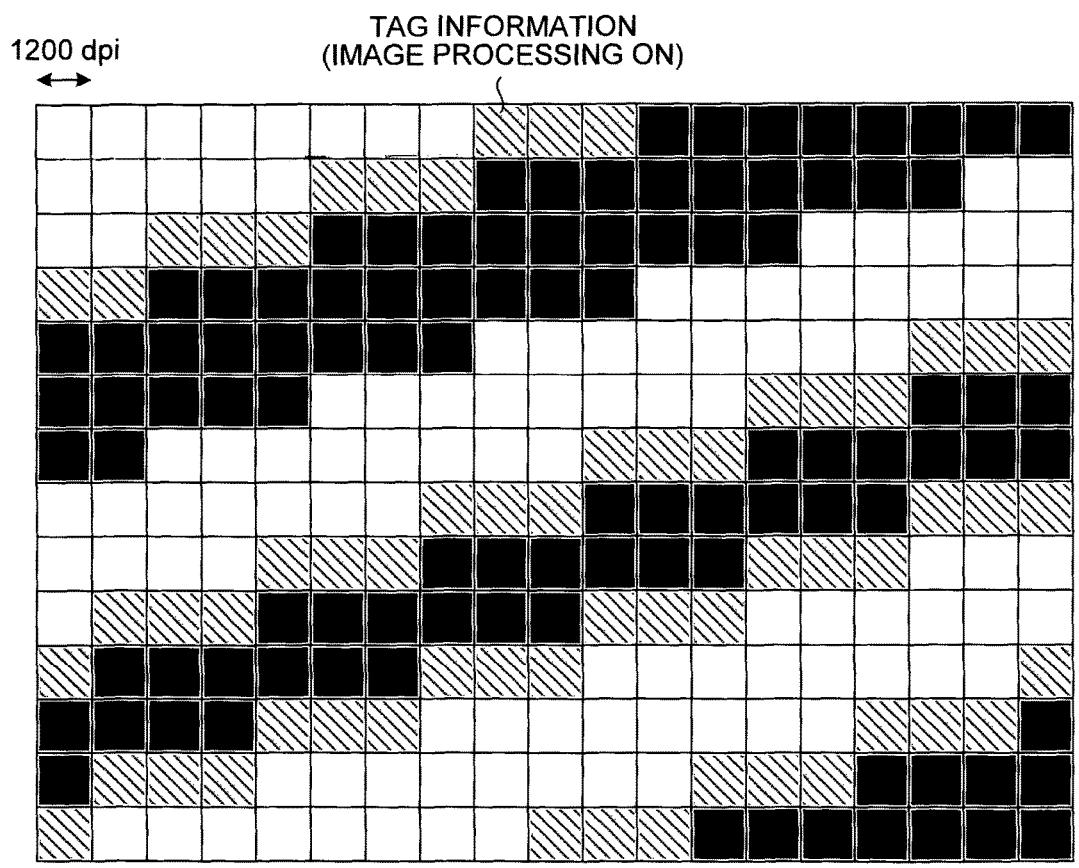
FIG. 27 is a diagram illustrating an exemplary image having a first resolution (1200 dpi).
Figure 28:
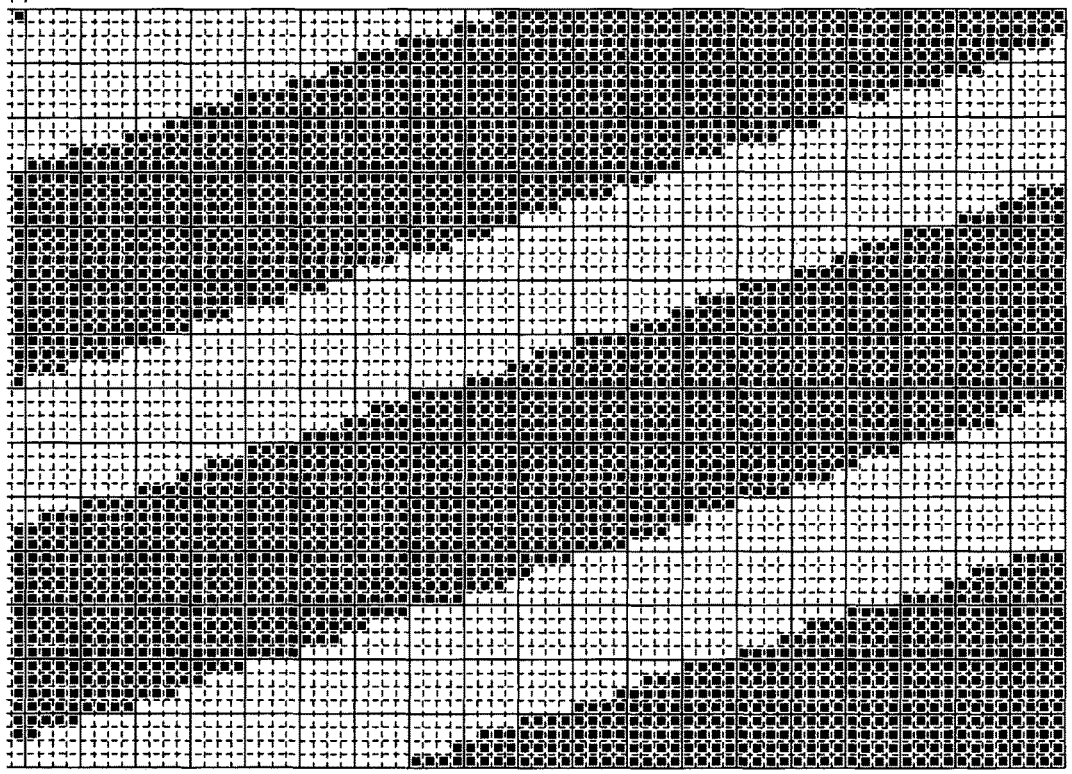
FIG. 28 is a diagram illustrating an image that represents the image having the first resolution (1200 dpi) converted to an image having a second resolution (4800 dpi) using the pixel pattern illustrated in FIG. 26B.

FIG. 27 is a diagram illustrating an exemplary image having the first resolution (1200 dpi). FIG. 28 is a diagram illustrating an image having the second resolution (4800 dpi) converted from an image having the first resolution (1200 dpi) illustrated in FIG. 27 using the pixel pattern illustrated in the part (B) in FIG. 26.

The converter 3252 converts a plurality of target pixels in the image data having the first resolution to the selected image-processed pixel pattern. This conversion enables the color printer 2000 to perform various types of image processing that are not limited to thinning or thickening of a character or line. For example, the color printer 2000 can smooth edges when increasing the resolution of a parallel line pattern as illustrated in FIG. 27.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

EXPLANATION OF LETTERS OR NUMERALS

2000 color printer
2010 optical scanning device
2030a, 2030b, 2030c, 2030d photoconductor drum
2031a, 2031b, 2031c, 2031d cleaning unit
2032a, 2032b, 2032c, 2032d charging unit
2033a, 2033b, 2033c, 2033d developing roller
2034a, 2034b, 2034c, 2034d toner cartridge
2040 transfer belt
2042 transfer roller
2050 fixing roller
2054 paper feeding roll
2056 pair of registration rollers
2058 paper ejection roller
2060 paper feeding tray
2070 paper ejection tray
2080 communication control device
2090 printer control device
2104 polygon mirror
2105a, 2105b, 2105c, 2105d scanning lens
2106a, 2106b, 2106c, 2106d, 2108b, 2108c folding mirror
2200a, 2200b, 2200c, 2200d light source
2201a, 2201b, 2201c, 2201d coupling lens 2202a, 2202b, 2202c, 2202d aperture plate
2204a, 2204b, 2204c, 2204d cylindrical lens
2245 density detector
2246a, 2246b, 2246c, 2246d home position sensor
3101 interface unit
3102 image processing unit
3103 drive control unit
3211 flash memory
3212 RAM
3213 IF circuit
3214 CPU
3220 attribute isolator
3221 color converter
3222 ink generator
3223 gamma corrector
3224 distortion corrector
3225 quasi-halftone processor
3226 tag generator
3232 clock generator
3233 modulation signal generator
3234 light source driver
3251 buffer memory
3252 converter
3253 gamma converter
3254 register memory
3255 processor
3261 condition storage
3262 pattern storage
3263 identifying unit
3264 pattern generator

The invention claimed is:

1. An image forming apparatus that forms an image corresponding to light emitted from a light source, the image forming apparatus comprising:
an image processing unit implemented by circuitry that
generates image data having a first resolution and tag information indicating whether to perform image processing, the tag information being associated with each of pixels of the image data having the first resolution, and
adds the tag information that indicates performing image processing to a plurality of pixels that constitute a predetermined shape;
a converter implemented by the circuitry that converts the image data having the first resolution to image data having a second resolution higher than the first resolution;
a light source driver implemented by the circuitry that drives the light source using a modulation signal corresponding to the image data having the second resolution;
an identifying unit implemented by the circuitry that
identifies a target pixel to be subjected to image processing in the image data having the first resolution on a basis of the tag information, and
identifies, as the target pixel, each of pixels to which the tag information indicating performing image processing is added and that are included in an area that matches the predetermined shape; and
a pattern generator implemented by the circuitry that
generates the image-processed pixel pattern on a basis of shades of pixels around the target pixel,
generates an image-processed pixel pattern having the second resolution according to the target pixel,
selects an image-processed pixel pattern having the second resolution corresponding to the target pixels within the predetermined shape,
outputs, as the image-processed pixel pattern, a single pixel pattern selected from among a plurality of pixel patterns registered in advance according to the shades of the pixels around the target pixel, wherein
the converter converts the target pixels in the image data having the first resolution to the generated image-processed pixel pattern.

2. The image forming apparatus according to claim 1, wherein
the converter converts pixels other than the target pixel to have a pixel pattern according to density of the pixels.

3. The image forming apparatus according to claim 1, wherein
the converter, the light source driver, the identifying unit, and the pattern generator are integrated in a single integrated device.

4. The image forming apparatus according to claim 1, wherein
the light source is a vertical-cavity surface-emitting laser.

5. An image forming apparatus that forms an image corresponding to light emitted from a light source, the image forming apparatus comprising:
an image processing unit implemented by circuitry that
generates image data having a first resolution and tag information indicating whether to perform image processing, the tag information being associated with each of pixels of the image data having the first resolution, and
generates the image data having the first resolution on a basis of input image data and generates the tag information on a basis of attribute information added to each of pixels of the input image data,
adds the tag information that indicates performing image processing to a pixel that has attribute information denoting a character or a line and that is near an edge of the character or the line, and
adds the tag information that indicates performing image processing to a pixel that forms an edge of the character or the line;
a converter implemented by the circuitry that
converts the image data having the first resolution to image data having a second resolution higher than the first resolution;
a light source driver implemented by the circuitry that
drives the light source using a modulation signal corresponding to the image data having the second resolution;
an identifying unit implemented by the circuitry that
identifies a target pixel to be subjected to image processing in the image data having the first resolution on a basis of the tag information, and
identifies the pixel to which the tag information that indicates performing image processing is added, as the target pixel; and
a pattern generator implemented by the circuitry that
generates an image-processed pixel pattern having the second resolution according to the target pixel, the pixel pattern narrowing a black portion of the character or the line according to shades of pixels around the target pixel, wherein
the converter converts the target pixel in the image data having the first resolution to the generated image-processed pixel pattern.

6. The image forming apparatus according to claim 5, wherein
the image processing unit adds the tag information that indicates performing image processing to a pixel that forms an edge of a black portion around a blank character or line,
the identifying unit identifies the pixel to which the tag information that indicates performing image processing is added, as the target pixel, and
the pattern generator generates a pixel pattern that widens a white portion of the blank character or line according to shades of pixels around the target pixel.

7. The image forming apparatus according to claim 5, wherein
the image processing unit adds the tag information that indicates performing image processing to a pixel that forms an edge of a blank character or line,
the identifying unit identifies, as the target pixel, a pixel of a black portion adjacent to and around an area of the pixel to which the tag information that indicates performing image processing is added, and
the pattern generator generates a pixel pattern that narrows a black portion around the blank character or line according to shades of pixels around the target pixel.

* * * * *